US012202141B2

(12) United States Patent
Mizobe et al.

(10) Patent No.: US 12,202,141 B2
(45) Date of Patent: Jan. 21, 2025

(54) METHOD OF SUPPORTING ADJUSTMENT OF PARAMETER SET OF ROBOT, A NON-TRANSITORY COMPUTER-READABLE STORAGE MEDIUM, AND INFORMATION PROCESSING DEVICE

(71) Applicant: SEIKO EPSON CORPORATION, Tokyo (JP)

(72) Inventors: Kimitake Mizobe, Chino (JP); Ryutaro Seki, Shiojiri (JP); Atsushi Toyofuku, Shiojiri (JP); Jun Toda, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 275 days.

(21) Appl. No.: 17/509,100

(22) Filed: Oct. 25, 2021

(65) Prior Publication Data

US 2022/0126440 A1    Apr. 28, 2022

(30) Foreign Application Priority Data

Oct. 27, 2020   (JP) ................................. 2020-179522

(51) Int. Cl.
*B25J 9/16*    (2006.01)
(52) U.S. Cl.
CPC ............. *B25J 9/163* (2013.01); *B25J 9/1689* (2013.01)
(58) Field of Classification Search
CPC ........ B25J 9/163; B25J 9/1689; B25J 9/1653; B25J 13/088; B25J 9/1694; G05B 2219/39412; G05B 2219/35433; G05B 13/042
See application file for complete search history.

(56) References Cited

U.S. PATENT DOCUMENTS 10,427,296 B1 * 10/2019 Sampedro ................ B25J 9/163
2007/0252839 A1 * 11/2007 Joly ........................ B25J 9/1664
345/474

(Continued)

FOREIGN PATENT DOCUMENTS

CN      107253194 A   * 10/2017
JP      2003103482 A     4/2003
(Continued)

*Primary Examiner* — Khoi H Tran
*Assistant Examiner* — Dairon Estevez
(74) *Attorney, Agent, or Firm* — Samson G. Yu

(57) ABSTRACT

A method of the present disclosure includes (a) a step of receiving track information for specifying a track of a target operation of a robot, (b) a step of acquiring, according to an instruction to adjust a parameter set for controlling the target operation, about one or more initial parameter sets, values of evaluation indicators of control results obtained when causing the robot to execute the target operation using the respective initial parameter sets, (c) a step of displaying, on a display section, one or more reference displays based on the acquired values of the evaluation indicators, and (d) a step of receiving an input of condition information for deciding a condition of optimization processing for the parameter set, the condition information being condition information about the evaluation indicators, performing the optimization processing for the parameter set according to the condition information, and determining a value of a new parameter set.

6 Claims, 13 Drawing Sheets

(56) References Cited

U.S. PATENT DOCUMENTS

| | | | |
|---|---|---|---|
| 2011/0093120 A1* | 4/2011 | Ando | B25J 9/1638 |
| | | | 700/260 |
| 2011/0208356 A1 | 8/2011 | Kato et al. | |
| 2015/0148956 A1* | 5/2015 | Negishi | B25J 9/163 |
| | | | 700/253 |
| 2018/0036882 A1* | 2/2018 | Kimura | B25J 9/1664 |
| 2019/0171776 A1* | 6/2019 | Huang | G06N 7/01 |
| 2019/0361467 A1* | 11/2019 | Fujita | G05D 3/12 |
| 2020/0005499 A1 | 1/2020 | Tsuneki et al. | |
| 2020/0150599 A1* | 5/2020 | Tsuneki | G05B 13/0265 |
| 2020/0257252 A1* | 8/2020 | Tsuneki | G05B 13/042 |

FOREIGN PATENT DOCUMENTS

| | | | | |
|---|---|---|---|---|
| JP | 2006254630 A | * | 9/2006 | |
| JP | 2009125920 A | | 6/2009 | |
| JP | 20110167817 A | | 9/2011 | |
| JP | 2014186586 A | * | 10/2014 | |
| JP | 2019111604 A | | 7/2019 | |
| JP | 2019113985 A | | 7/2019 | |
| JP | 2020004080 A | | 1/2020 | |
| JP | 2020035159 A | | 3/2020 | |
| WO | WO-2019019926 A1 | * | 1/2019 | ............. G06F 11/34 |
| WO | 2019098044 A1 | | 5/2019 | |

\* cited by examiner

| | OPERATION MODE | OPERATION TIME | OVERSHOOT AMOUNT | |
|---|---|---|---|---|
| B74 ◉ | HIGH SPEED | 1.1 SECONDS | 0.4mm | L74 |
| B75 ○ | NORMAL | 1.4 SECONDS | 0.2mm | L75 |
| B76 ○ | HIGH ACCURACY | 1.6 SECONDS | 0.1mm | L76 |

SETTING OF RESTRICTION CONDITION

B77 — ◉ SET RESTRICTION WITH OPERATION TIME

OPERATION TIME UPPER LIMIT — D71
[ 1.2 ] SECONDS

LOWER LIMIT VALUE IN INITIAL EVALUATION: 1.1 SECONDS — R77

B78 — ○ SET RESTRICTION WITH OVERSHOOT AMOUNT

OVERSHOOT AMOUNT UPPER LIMIT — D72
[ ] mm

LOWER LIMIT VALUE IN INITIAL EVALUATION: 0.1mm — R78

[ DETERMINE ] B81    [ CANCEL ] B82

METHOD OF SUPPORTING ADJUSTMENT OF PARAMETER SET OF ROBOT, A NON-TRANSITORY COMPUTER-READABLE STORAGE MEDIUM, AND INFORMATION PROCESSING DEVICE

The present application is based on, and claims priority from JP Application Serial Number 2020-179522, filed Oct. 27, 2020, the disclosure of which is hereby incorporated by reference herein in its entirety.

BACKGROUND

1. Technical Field

The present disclosure relates to a method of supporting adjustment of a parameter set of a robot, a non-transitory computer-readable storage medium, and an information processing device.

2. Related Art

There has been a technique for setting control parameters of a robot. In a technique of JP-A-2003-103482 (Patent Literature 1), a server computer derives a plurality of adjustment parameters corresponding to optimization purposes such as "priority of operation time reduction", "priority of track accuracy", and "priority of energy consumption minimization". Optimization effects are calculated about each of the derived adjustment parameters. For example, a rate of operation time reduction is calculated when the "priority of operation time reduction" is selected as a purpose of optimization. A reduction rate of an energy consumption is calculated when the "priority of energy consumption minimization" is selected. An operator checks the optimization effects and selects which adjustment parameters are introduced. A robot control panel changes data of present adjustment parameters to data of the adjustment parameters received from the server computer.

However, even if an optimization effect is indicated as, for example, "a rate of operation time reduction", a user not having sufficient experience in setting of parameters of a robot cannot grasp how a specific operation time of the robot is excellent. About parameters obtained with the "priority of operation time reduction" set as a purpose of optimization, the user cannot determine whether a value of "track accuracy" is within an allowable range for the user.

An inventor of this application modified the technique of Patent Literature 1 and examined a method of causing a user to designate a numerical value about an assumed range of track accuracy in advance and deriving parameters under the limitation of the numerical value with "priority of operation time reduction" set as a purpose of optimization. However, if the user is caused to designate a numerical value about the track accuracy in advance, the user is likely to designate an unrealizable numerical value. In such a case, adjustment parameters cannot be obtained by optimization processing.

SUMMARY

According to an aspect of the present disclosure, there is provided a method of supporting adjustment of a parameter set of a robot. The method includes: (a) a step of receiving track information for specifying a track of a target operation of the robot; (b) a step of acquiring, according to an instruction to adjust a parameter set for controlling the target operation, about one or more initial parameter sets prepared in advance, values of evaluation indicators of control results obtained when causing the robot to execute the target operation using the respective initial parameter sets; (c) a step of displaying, on a display section, one or more reference displays based on the values of the evaluation indicators acquired about the one or more initial parameter sets; and (d) a step of receiving an input of condition information for deciding a condition of optimization processing for the parameter set, the condition information being condition information about the evaluation indicators, performing the optimization processing for the parameter set according to the condition information, and determining a value of a new parameter set.

BRIEF DESCRIPTION OF THE DRAWINGS

FIG. 14 is a diagram showing a user interface screen displayed on the display of the setting device in step S207 in a second embodiment.

FIG. 15 is a diagram showing a user interface screen displayed on the display of the setting device in step S207 in a third embodiment.

DESCRIPTION OF EXEMPLARY EMBODIMENTS

A. First Embodiment

A1. Configuration of a Robot System

Figure 1:
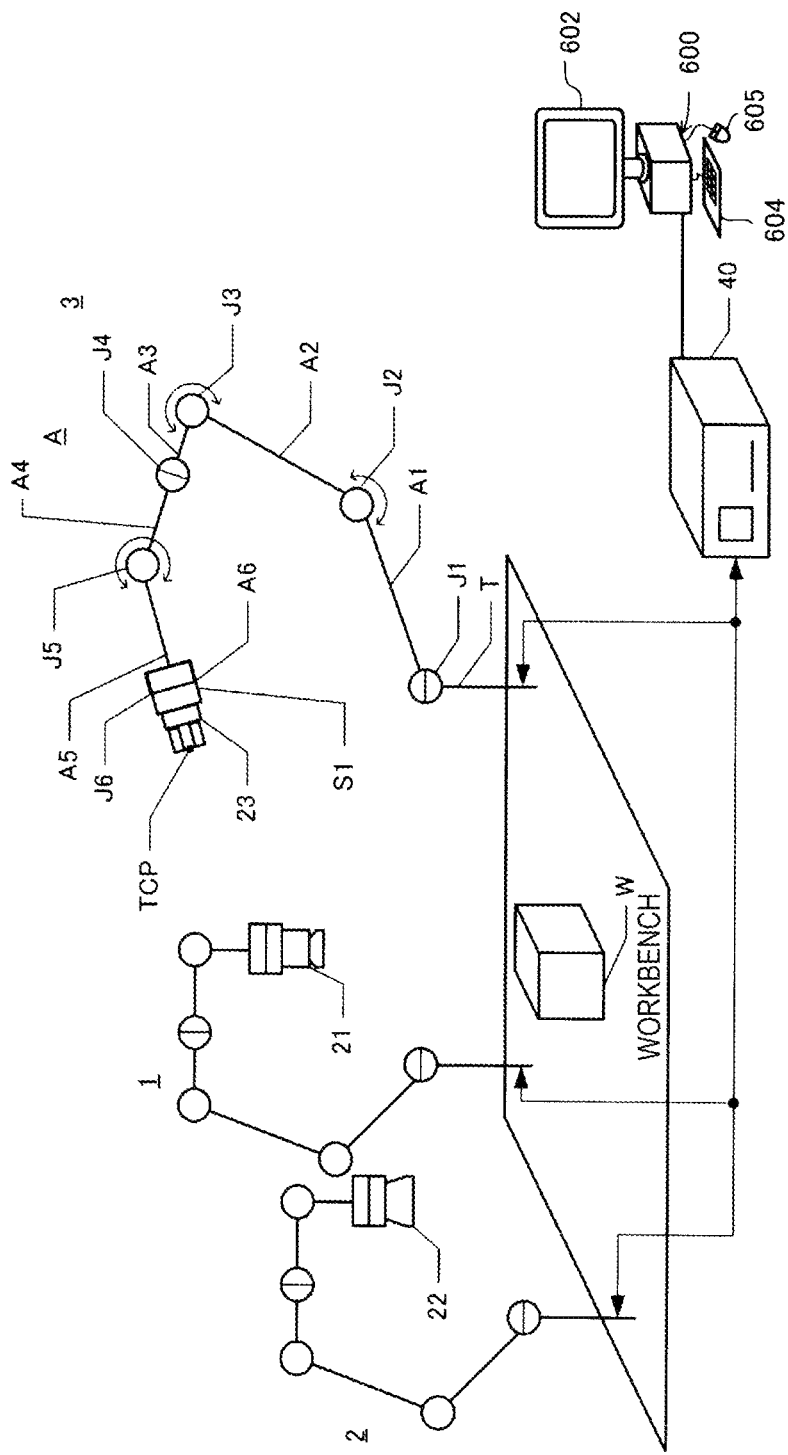
FIG. 1 is an explanatory diagram showing a robot system in an embodiment of the present disclosure.

FIG. 1 is an explanatory diagram showing a robot system in an embodiment of the present disclosure. The robot system in the embodiment of the present disclosure includes robots 1 to 3, a control device 40, and a setting device 600.

The control device 40 controls the robots 1 to 3. The control device 40 is communicably coupled to the robots 1 to 3 by cables. The control device 40 includes a CPU, which is a processor, a RAM, and a ROM. The RAM includes a main memory and an auxiliary storage device. The CPU of the control device 40 loads a computer program stored in the auxiliary storage device to the main memory and executes the computer program to thereby cause the robots 1 to 3 to operate.

The setting device 600 generates an operation program for specifying operations of the robots 1 to 3 and sets parameters of the operation program. The setting device 600 is communicably coupled to the control device 40 by a cable. The operation program generated by the setting device 600 and the parameters set by the setting device 600 are transmitted to the control device 40. The control device 40 causes the robots 1 to 3 to operate according to the operation program and the parameters received from the setting device 600. The configuration of the setting device 600 is explained below.

The robots 1 to 3 are general-purpose robots capable of performing various kinds of work by being taught how to perform the various kinds of work. More specifically, the robots 1 to 3 are single-arm robots used by attaching various end effectors to arms A. The robots 1 to 3 are six-axis robots respectively including different end effectors 21, 22, and 23. In this embodiment, the configurations of the arms A and shafts are equal in the robots 1 to 3.

The configuration of the robots 1 to 3 is explained using the robot 3 as an example. The robot 3 includes a base T, six arm members A1 to A6, and six joints J1 to J6. The base T is fixed to a workbench. The base T and the six arm members A1 to A6 are coupled by the joints J1 to J6. In this embodiment, the joints J2, J3, and J5 are bending joints. The joints J1, J4, and J6 are torsion joints. Rotation axes in the joints J1 to J6 are referred to as "working axes" as well in this specification.

An end effector is attached to the arm member A6 located at the distal end of the arm A. The robot 3 can dispose the end effector in any position within a range decided in advance and give any posture, that is, angle to the end effector by driving the six-axis arm A.

End effectors different from one another are attached to the robots 1 to 3. The end effector attached to the robot 1 is an imaging section 21. The imaging section 21 can capture an image in a visual field. The imaging section 21 includes a mechanism capable of adjusting an exposure time and an aperture. The end effector attached to the robot 2 is an illuminating section 22. The illuminating section 22 can irradiate light in an irradiation range. The illuminating section 22 includes a mechanism capable of adjusting brightness. In the following explanation, the imaging section 21 and the illuminating section 22 are referred to as "optical system" as well. The end effector attached to the robot 3 is a gripper 23. The gripper 23 can grip a target object W.

In this embodiment, positions fixed relatively to the end effectors included in the robots 1 to 3 are defined as tool center points (TCPs). The positions of the TCPs are reference positions of the end effectors. TCP coordinate systems are defined with the TCPs as origins. The TCP coordinate systems are three-dimensional orthogonal coordinate systems fixed relatively to the end effectors.

An acceleration sensor S1 is attached to, together with the end effector, the arm member A6 located at the distal end of the arm A. The acceleration sensor S1 can acquire information concerning accelerations in directions of three axes perpendicular to one another and angular velocities around the axes. The control device 40 recognizes, based on the information, a tilt of the end effector, moving velocity including speed and a direction of the end effector, and a present position of the end effector.

A coordinate system specifying a space in which the robots 1 to 3 are set is referred to as "robot coordinate system" in this specification. The robot coordinate system is a three-dimensional orthogonal coordinate system specified by an x axis and a y axis orthogonal to each other on the horizontal plane and a z axis having a vertical upward direction as a positive direction (see an upper left part of FIG. 1). A negative direction in the z axis coincides with the gravity direction. Any position in a three-dimensional space can be represented by positions in x, y, and z directions. A rotation angle around the x axis is represented by Rx, a rotation angle around the y axis is represented by Ry, and a rotation angle around the z axis is represented by Rz. Any posture in the three-dimensional space can be represented by rotation angles in Rx, Ry, and Rz directions. In the following explanation, "position" described in this specification can mean a posture as well.

In this embodiment, a relation among coordinate systems are defined in advance. As a result, values of coordinates in the coordinate systems can be converted into one another. That is, positions and vectors in a TCP coordinate system, a sensor coordinate system, and a robot coordinate system can be converted into one another. To facilitate understanding of a technique, technical content is explained assuming that the control device 40 controls the position of the TCP in the robot coordinate system.

Figure 2:
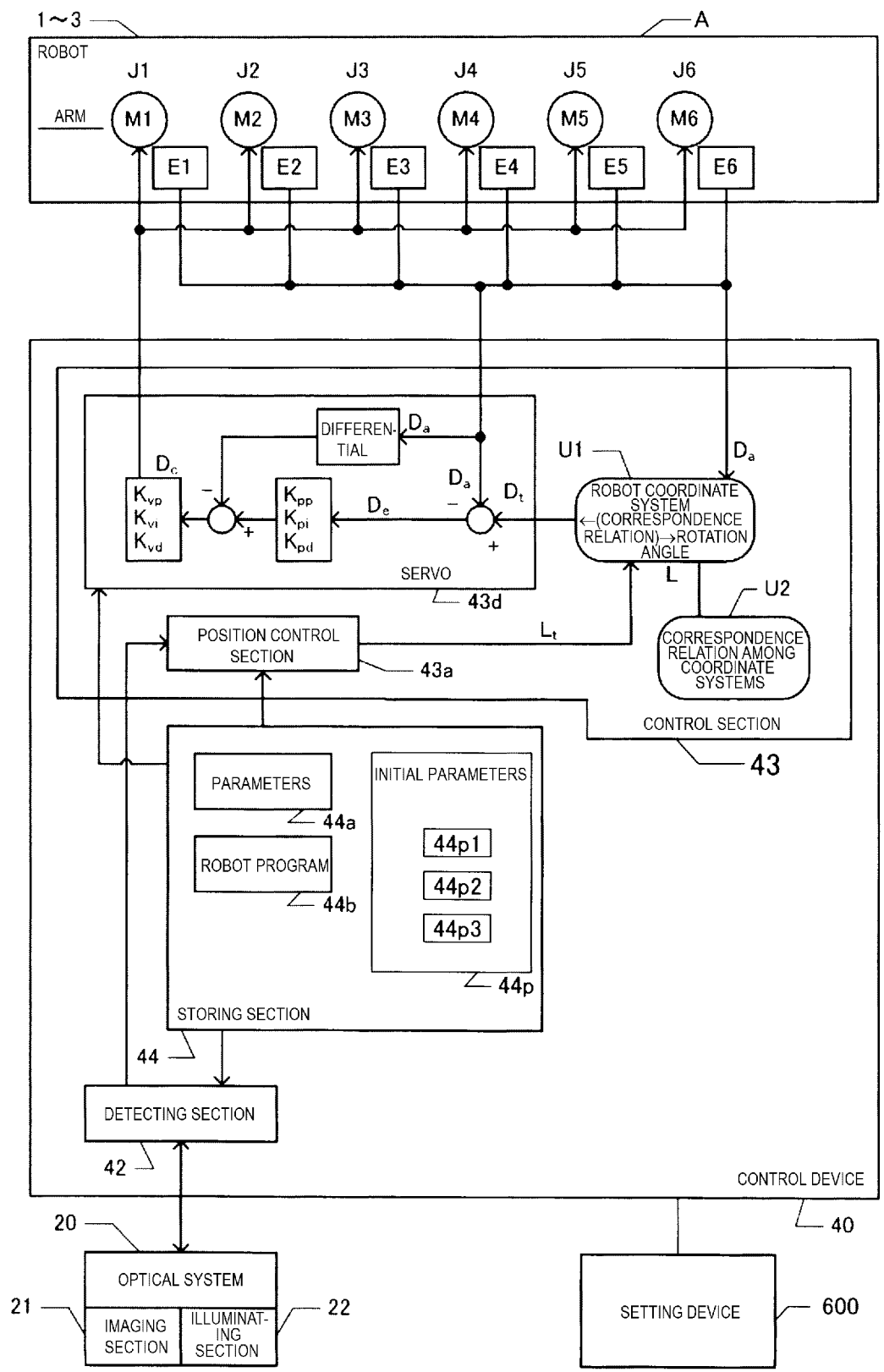
FIG. 2 is a block diagram showing a relation among functional blocks of a control device, robots, and an optical system.

A2. Control of the robot (1) Configuration of the Robot and Functions of the Control Device FIG. 2 is a block diagram showing a relation among functional blocks of the control device 40, the robots 1 to 3, and an optical system 20. Each of the robots 1 to 3 includes motors M1 to M6 functioning as actuators and encoders E1 to E6 functioning as sensors.

The motors M1 to M6 respectively drive the joints J1 to J6. Control of the arm A of the robot is specifically performed by controlling the motors M1 to M6. Ammeters are respectively included in power supply lines for supplying electric power to the motors M1 to M6. The control device 40 can measure, via the ammeters, electric currents supplied to the motors M1 to M6. The encoders E1 to E6 respectively detect rotation angles of the motors M1 to M6.

The control device 40 includes a storing section 44. The control device 40 functions as a detecting section 42 and a control section 43.

The detecting section 42 is coupled to the imaging section 21 and the illuminating section 22 configuring the optical system 20. The detecting section 42 detects a target object and specifies a position and a posture of the target object. The control section 43 performs position control for the end effectors of the robots 1 to 3. In the following explanation, the position control for the end effectors is explained.

(2) Position Control for the End Effectors of the Robots

In the control section 43, a correspondence relation U1 between a combination of rotation angles of the motors M1 to M6 and positions of the TCPs in the robot coordinate system is stored in a not-shown storage medium (see a middle right part of FIG. 2). In the control section 43, a correspondence relation U2 among the coordinate systems is further stored in the not-shown storage medium. The correspondence relations U1 and U2 may be stored in the storing section 44.

The control section 43 can convert, based on the correspondence relation U2, a vector in any coordinate system into a vector in another coordinate system. For example, the control section 43 can acquire, based on an output of the acceleration sensor S1, accelerations of the robots 1 to 3 in the sensor coordinate system and convert the accelerations into accelerations of the TCPs in the robot coordinate system.

The control section 43 controls the positions of parts of the robots 1 to 3 by driving the arms A. The control section 43 includes a position control section 43a and a servo 43d as functional sections (see a middle part of FIG. 2).

(i) Processing in the Servo 43d

The servo 43d executes servo control. More specifically, the servo 43d executes feedback control for matching a rotation angle Da of the motors M1 to M6 indicated by outputs of the encoders E1 to E6 and a target angle Dt, which is a control target. The servo 43d executes PID control about positions using a deviation De between the rotation angle Da and the target angle Dt, an integral of the deviation De, and a differential of the deviation De. In FIG. 2, a proportional gain Kpp, an integral gain Kpi, and a differential gain Kpd are shown (see a middle left part of FIG. 2).

The servo 43d executes PID control about velocity using a deviation between an output of the PID control about positions executed using Kpp, Kpi, and Kpd and a differential of the rotation angle Da, an integral of the deviation, and a differential of the deviation. In FIG. 2, a proportional gain Kvp, an integral gain Kvi, and a differential gain Kvd are shown (see the middle left part of FIG. 2).

As a result of the processing explained above, a control amount Dc is determined. The control amount Dc is determined about each of the motors M1 to M6. The control section 43 controls the motors M1 to M6 with the control amounts Dc of the motors M1 to M6. A signal for the control section 43 to control the motors M1 to M6 is a PWM (Pulse Width Modulation)-modulated signal. The servo gains Kpp, Kpi, Kpd, Kvp, Kvi, and Kvd used by the servo 43d are parameters that can be changed. In the following explanation, before processing in the position control section 43a is explained, parameters of the robots 1 to 3 are explained.

(ii) Parameters of the Robots

In the storing section 44, various parameters 44a, a robot program 44b for controlling the robots 1 to 3, and initial parameters 44p are stored (see the middle left part of FIG. 2). The robot program 44b mainly indicates a sequence of work carried out by the robots 1 to 3, that is, order of operations. The robot program 44b is described by a combination of commands defined in advance.

The parameters 44a represent specific values required for realizing operations. The parameters 44a are described as arguments of commands. The servo gains Kpp, Kpi, Kpd, Kvp, Kvi, and Kvd are parts of the parameters 44a. The parameters 44a can be optimized for each of the operations.

In this embodiment, the parameters 44a and the robot program 44b are generated by teaching for the robots using the setting device 600 and stored in the storing section 44 (see a lower right part of FIG. 2). The parameters 44a and the robot program 44b stored in the storing section 44 can be corrected by the setting device 600.

Figure 3:
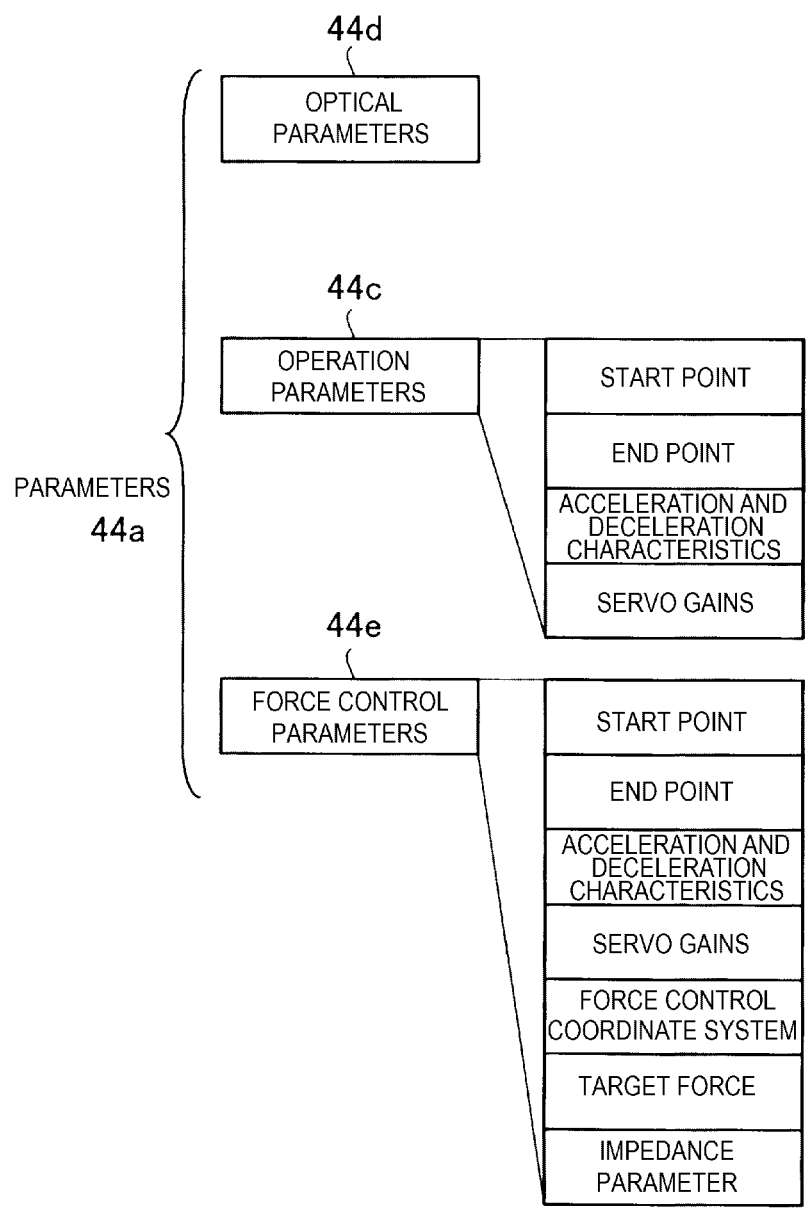
FIG. 3 is a diagram showing parameters.

FIG. 3 is a diagram showing the parameters 44a. The parameters 44a include operation parameters 44c, optical parameters 44d, and force control parameters 44e. The optical parameters 44d are parameters for controlling the imaging section 21 of the robot 1 and the illuminating section 22 of the robot 2 (see a middle left part of FIG. 1 and an upper part of FIG. 3).

The operation parameters 44c are parameters concerning the operations of the arms A of the robots 1 to 3. The operation parameters 44c are referred to in position control. A series of work by the robots 1 to 3 is divided into a plurality of operations. The operation parameters 44c in carrying out the operations are generated by teaching.

The operation parameters 44c include parameters indicating "start points" and "end points" in the operations (see a middle part of FIG. 3). The start points and the end points may be defined by various coordinate systems. In this embodiment, "start points" and "end points" of the TCPs of the control target robots are defined by the robot coordinate system. Translation positions and rotation positions about the axes of the robot coordinate system are defined.

The operation parameters 44c include "acceleration and deceleration characteristics" of the TCPs in a plurality of operations (see the middle part of FIG. 3). Velocities of the TCPs at times when the TCPs of the robots 1 to 3 move from the start points to the end points of the operations are specified by the acceleration and deceleration characteristics.

Figure 4:
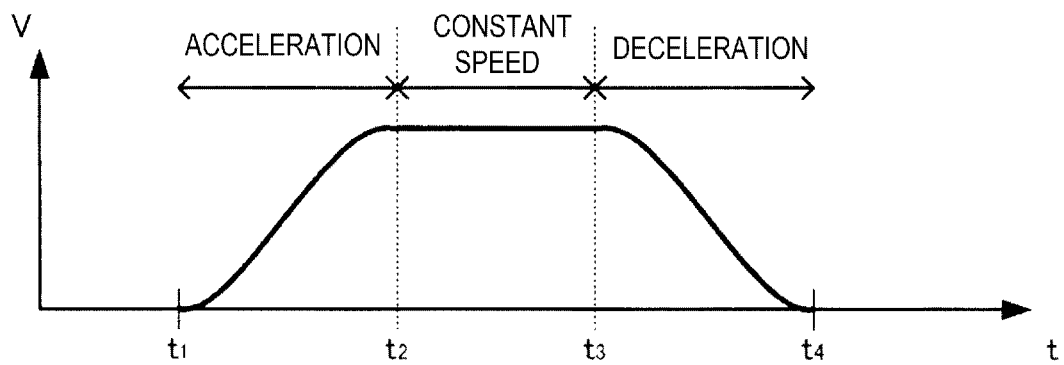
FIG. 4 is a diagram showing an example of speed of a TCP controlled according to acceleration and deceleration characteristics.

FIG. 4 is a diagram showing an example of velocity of the TCP controlled according to the acceleration and deceleration characteristics. In FIG. 4, velocity V of the TCP is specified at times from movement start time t1 of the TCP at a start point until time t4 when the TCP reaches an end point. In the example shown in FIG. 4, the TCP accelerates at target acceleration in a period of the time t1 to time t2, keeps constant velocity in a period of the time t2 to time t3, and decelerates at target acceleration in a period of the time t3 to time t4. In this embodiment, it is assumed that the magnitude of the absolute value of the target acceleration during the acceleration and the magnitude of the absolute value of the target acceleration during the deceleration are the same.

The acceleration and deceleration characteristics may also be defined by various coordinate systems. In this embodiment, velocity described by the acceleration and deceleration characteristics is velocity of the TCP of the control target robot. The velocity of the TCP is defined by the robot coordinate system. That is, translation speeds and rotating speeds (angular velocities) about the axes of the robot coordinate system are defined.

In the robots 1 to 3, a shape of a constituent portion of the robot ahead of a certain joint can change according to an angle of joints present ahead of the joint. Accordingly, inertia, that is, an inertial moment ahead of the certain joint of the robots 1 to 3 can change according to an angle of a certain joint present ahead of the joint. For example, when the arm A takes a posture in which the six arm members A1 to A6 are lined up in a row, inertia of rotation based on the joint J1 is maximized (see FIG. 1). At this time, the center of gravity of the entire six arm members A1 to A6 is present in a position most distant from the joint J1. On the other hand, when the arm A takes a posture in which the center of gravity of the entire six arm members A1 to A6 is the closest to the joint J1, the inertia of the rotation based on the joint J1 is minimized. Acceleration that a motor can realize changes according to inertia of a target object moved by the motor. Accordingly, accelerations instructed to motors that drive joints are determined according to inertia ahead of the joints (see t1 to t2 and t3 to t4 in FIG. 4). Acceleration of the TCP is decided as explained below.

Figure 5:
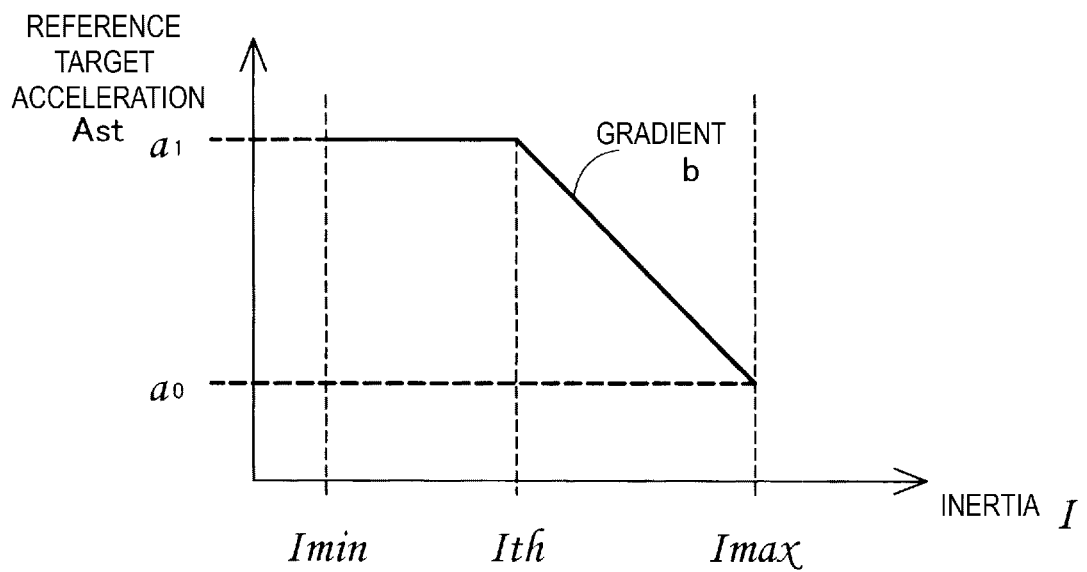
FIG. 5 is a graph showing a relation between reference target acceleration of the TCP included in the acceleration and deceleration characteristics of the TCP and inertia.

FIG. 5 is a graph showing a relation between reference target acceleration Ast of the TCP included in the acceleration and deceleration characteristics of the TCP and inertia I. About the joins J1 to J6, limited maximum acceleration a0 is decided as one of the operation parameters 44c. The limited maximum acceleration a0 is acceleration that a motor can steadily realize when the inertia I in a configuration of the robot ahead of a certain joint is a maximum value Imax. About the joints J1 to J6, upper limit maximum acceleration a1 is decided as one of the operation parameters 44c. The upper limit maximum acceleration a1 is acceleration that the motor can steadily realize when the inertia I of the configuration of the robot ahead of the joint is equal to or smaller than a predetermined value Ith. The inertia Ith is a value between a minimum value Imin and the maximum value Imax of the inertia I of the configuration of the robot ahead of the joint. The limited maximum acceleration a0 and the upper limit maximum acceleration a1 are determined based on the premise that the robot retains a predetermined rated load.

As it is seen from FIG. 5, when the inertia ahead of the joint is equal to or smaller than the predetermined value Ith, the reference target acceleration Ast is a fixed value a1. When the inertia ahead of the joint is larger than the predetermined value Ith, the reference target acceleration Ast linearly decreases with respect to the inertia at a gradient b. That is, b is a rate of change of the reference target acceleration Ast.

$$b = \{(a0 - a1)/(I\max - Ih)\} \tag{Eq1}$$

Further, the reference target acceleration Ast is corrected according to the magnitude of a load retained by the robot. A target acceleration At of the TCP is obtained by multiplying the reference target acceleration Ast by a load correction coefficient CL (see t1 to t2 and t3 to t4 in FIG. 4).

$$At = CL \times Ast \tag{Eq2}$$

The load correction coefficient CL is decided by, for example, the following expression. When a load w retained by the robot is a rated load w0, c=1. When the load w retained by the robot is larger than the rated load w0, c<1. When the load w retained by the robot is smaller than the rated load w0, c>1.

$$c = \{-(w - w0)/(w\max - w\min)\} + 1$$
$$= d \times (w - w0) + 1$$

where, w is the magnitude of the load retained by the robot, w0 is a rated load serving as a reference, wmax is a maximum value of a load that the robot can retain, and wmin is a minimum value of the load that the robot can retain.

$$d = \{-1/(w\max - w\min)\}$$

Parameters of the acceleration and deceleration characteristics, which are parts of the operation parameters 44c, include the limited maximum acceleration a0, the upper limit maximum acceleration a1, the gradient b of the reference target acceleration Ast, and a gradient d of the load correction coefficient CL (see the middle part of FIG. 3). A change of acceleration and deceleration of the working axes can be automatically set for each of operations by optimizing these parameters with processing explained below.

The operation parameters 44c include the servo gains Kpp, Kpi, Kpd, Kvp, Kvi, and Kvd (see the middle part of FIG. 3). The control section 43 adjusts the servo gains Kpp, Kip, Kpd, Kvp, Kvi, and Kvd applied by the servo 43d to be values stored as the operation parameters 44c. In this embodiment, values of the servo gains are decided for each of the operations. However, the servo gains may be decided for each of shorter sections in optimization and the like explained below.

The force control parameters 44e (see a lower part of FIG. 3) are parameters concerning force control of the robots 1 to 3 and are referred to in the force control. To facilitate understanding of the technique, in this specification, explanation is omitted about details of the force control.

The force control parameters 44e include parameters indicating a "start point", an "end point", "acceleration and deceleration characteristics", and "servo gains". In the force control parameters 44e, the start point, the end point, the acceleration and deceleration characteristics, and the servo gains are the same as the start point, the end point, the acceleration and deceleration characteristics, and the servo gains (see the middle part of FIG. 3) belonging to the operation parameters 44c.

However, in the case of the force control, at least a part of start points and end points are sometimes not defined in one operation. For example, when collision avoidance or tracer control is performed to reduce force acting in a certain direction to zero in a certain operation, in some case, a start point and an end point in the direction are not defined and a state in which a position can optionally change is defined to reduce force in the direction to zero.

The force control parameters 44e include information indicating a "force control coordinate system" (see the lower part of FIG. 3). The force control coordinate system is a coordinate system for defining a target force of the force control. Before optimization is performed, a start point of a target force vector is the origin of the force control coordinate system. One axis of the force control coordinate system is directed to the direction of the target force vector. When various target forces in the force control are defined in teaching of the robot, working points of target forces in operations of respective kinds of work are taught. For example, when the direction of a target object is changed in a state in which a point of the target object is brought into contact with another object and a constant target force is caused to act on the other object from the target object at a contact point of the target object and the other object, a force control coordinate system is defined again as explained below. A point where the target object is in contact with the other object is a working point of a target force and a force control coordinate system having the working point as the origin is defined.

The force control parameters 44e include, as parameters, information for specifying the coordinate system in which an acting point of the target force of the force control is the origin and one axis is directed in the direction of the target force, that is, the force control coordinate system. Various definitions are possible about the parameters. For example, parameters for specifying the force control coordinate system can be defined by data indicating a relation between the force control coordinate system and other coordinate systems (the robot coordinate system and the like).

The force control parameters 44e include a "target force" (see the lower part of FIG. 3). The target force is force taught as force that should act on any point in various kinds of work and is defined by the force control coordinate system. A target force vector indicating the target force is defined as a start point of the target force vector and six-axis components from the start point, that is, translational forces of three axes and torques of the three axes and can be represented by the force control coordinate system. If a relation between the force control coordinate system and the other coordinate systems is used, the target force can be converted into a vector in any coordinate system, for example, the robot coordinate system.

"Impedance parameters" are included in the force control parameters 44e (see the lower part of FIG. 3). Impedance control is control for realizing virtual mechanical impedance with driving forces of the motors M1 to M6. In the impedance control, virtual mass of the TCP is defined as a virtual inertia coefficient m. Viscosity resistance virtually received by the TCP is defined as a virtual viscosity coefficient d. A spring constant of an elastic force virtually received by the TCP is defined as a virtual elasticity coefficient k. The impedance parameters are these m, d, and k. The impedance parameters are defined about translation and rotation with respect to the axes of the robot coordinate system.

In this embodiment, values of the force control coordinate system, the target force, and the impedance parameters are set for each of operations executed by the robots (see FIG. 3). However, the values may be set for each of shorter sections.

The initial parameters 44p represent specific values required for realizing operations (see a lower left part of FIG. 2). Whereas the parameters 44a are decided about the operations, the initial parameters 44p are general-purpose parameters decided to be able to cope with various operations. The initial parameters 44p are stored in the storing section 44 in advance when the robots 1 to 3 and the control device 40 are shipped from a factory.

The initial parameters 44p are decided as explained below. First, one hundred operations, start points and end points of which are decided at random, are determined. Conditions such as a lower limit of average operation velocity, an upper limit of an overshoot amount, an upper limit of a torque ratio, and a lower limit of an estimated life are decided about the one hundred operations. Then, to maximize average operation velocity, optimization processing is performed by the setting device 600 or other computers. As a result, initial parameters satisfying the set conditions and having large average operation velocity are determined. An operation time, an overshoot amount, a torque ratio, estimated life, and the like are explained below.

In this embodiment, the initial parameters 44p include three sets of parameters respectively representing specific values required for realizing operations. The three sets of parameters are (a) a set of parameters in which the overshoot amount is large but the operation time is short, (b) a set of parameters in which the operation time is long but the overshoot amount is small, and (c) a set of parameters having an intermediate characteristic of the sets of the parameters. The set of parameters in which the overshoot amount is large but the operation time is short is referred to as "high-speed parameters 44p1" as well (see a lower center part of FIG. 2). The set of parameters in which the operation time is long but the overshoot amount is small is referred to as "high-accuracy parameters 44p3" as well. The set of parameters having the intermediate characteristic is referred to as "standard parameters 44p2" as well.

(iii) Processing in the Position Control Section 43a

The position control section 43a executes control of positions (see the middle left part of FIG. 2). More specifically, the control section 43 controls the motors M1 to M6 at a rotation angle derived from a target position by linear operation. A mode for controlling the motors M1 to M6 at the rotation angle derived from the target position by the linear operation is referred to as "position control mode" in this specification.

When performing control in the position control mode, the position control section 43a determines a target position Lt for each microoperation. When the target position Lt for each microoperation is obtained, the control section 43 converts, based on the target position Lt and the correspondence relation U1, operation positions in the directions of the axes specifying the robot coordinate system into the target angles Dt, which are target rotation angles of the motors M1 to M6 (see the middle right part of FIG. 2).

The servo 43d acquires the servo gains Kpp, Kpi, Kpd, Kvp, Kvi, and Kvd referring to the parameters 44a and derives the control amount Dc based on the target angle Dt (see the middle left part of FIG. 2). The control amount Dc is specified for each of the motors M1 to M6. The motors M1 to M6 are controlled by the control amounts Dc of the motors M1 to M6, respectively. As a result, in operations, the TCP moves from the start point to the end point according to the acceleration and deceleration characteristics through the target position Lt for each microoperation.

A3. Configuration of the Setting Device

Figure 6:
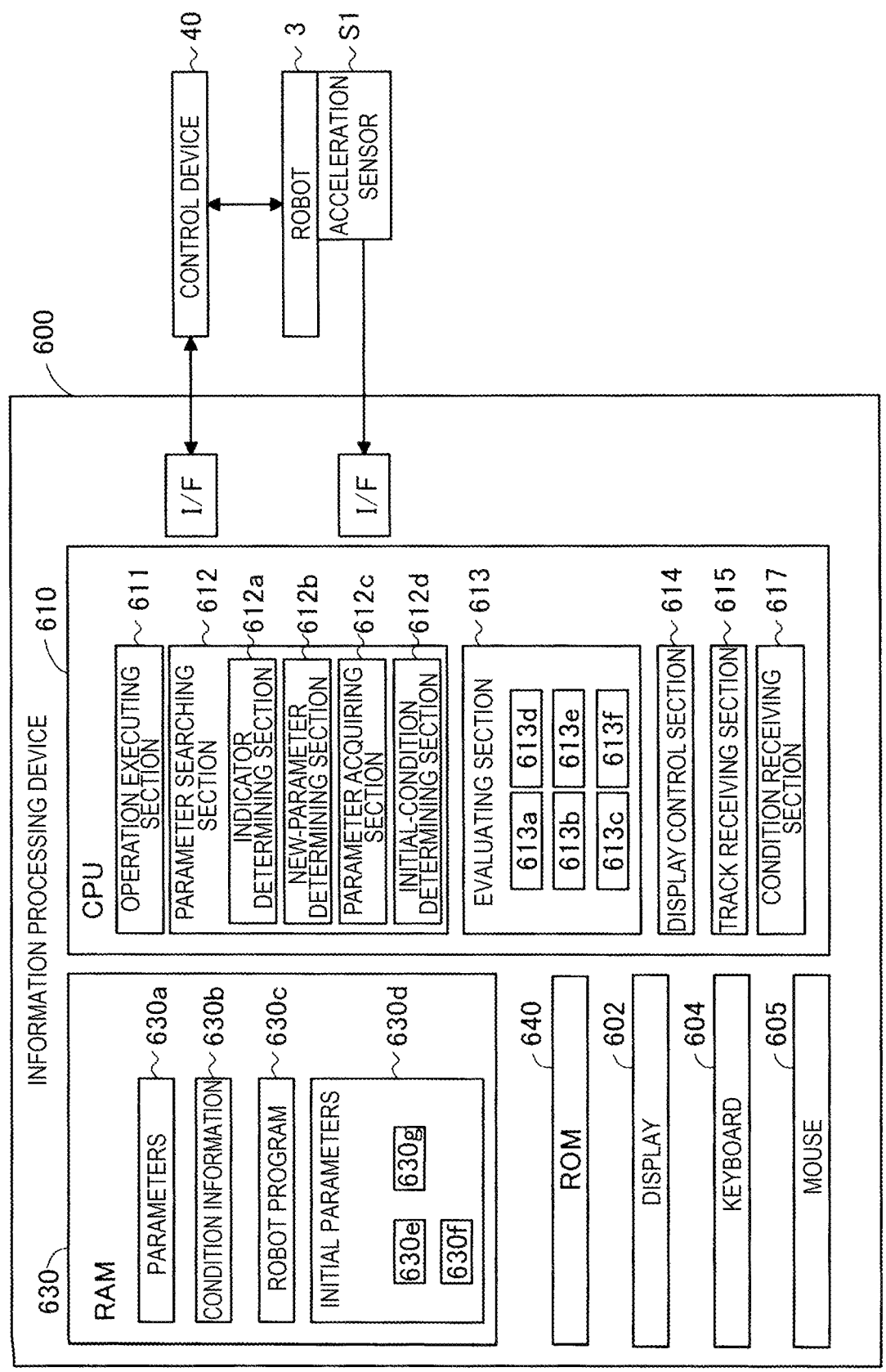
FIG. 6 is a block diagram showing the configuration of a setting device.

FIG. 6 is a block diagram showing the configuration of the setting device 600. The setting device 600 generates an operation program for specifying the operations of the robots 1 to 3 (see a lower right part of FIG. 1). The setting device 600 sets specific parameters required to realize the operations. To facilitate understanding of the technique, in FIG. 6, only the robot 3 is shown among the robots 1 to 3.

The setting device 600 is a computer including a display 602 functioning as an output device and a keyboard 604 and a mouse 605 functioning as an input device. The setting device 600 further includes a CPU 610, which is a processor, a RAM 630, and a ROM 640. The RAM 630 includes a main memory, which is a semiconductor memory, and a hard disk, which is an auxiliary storage device. The CPU 610 loads a computer program stored in the hard disk to the main memory and executes the computer program to thereby realize various functions including optimization processing for parameters. The setting device 600 is coupled to the acceleration sensor S1 of the robot 3 and the control device 40 via an interface.

Figure 7:
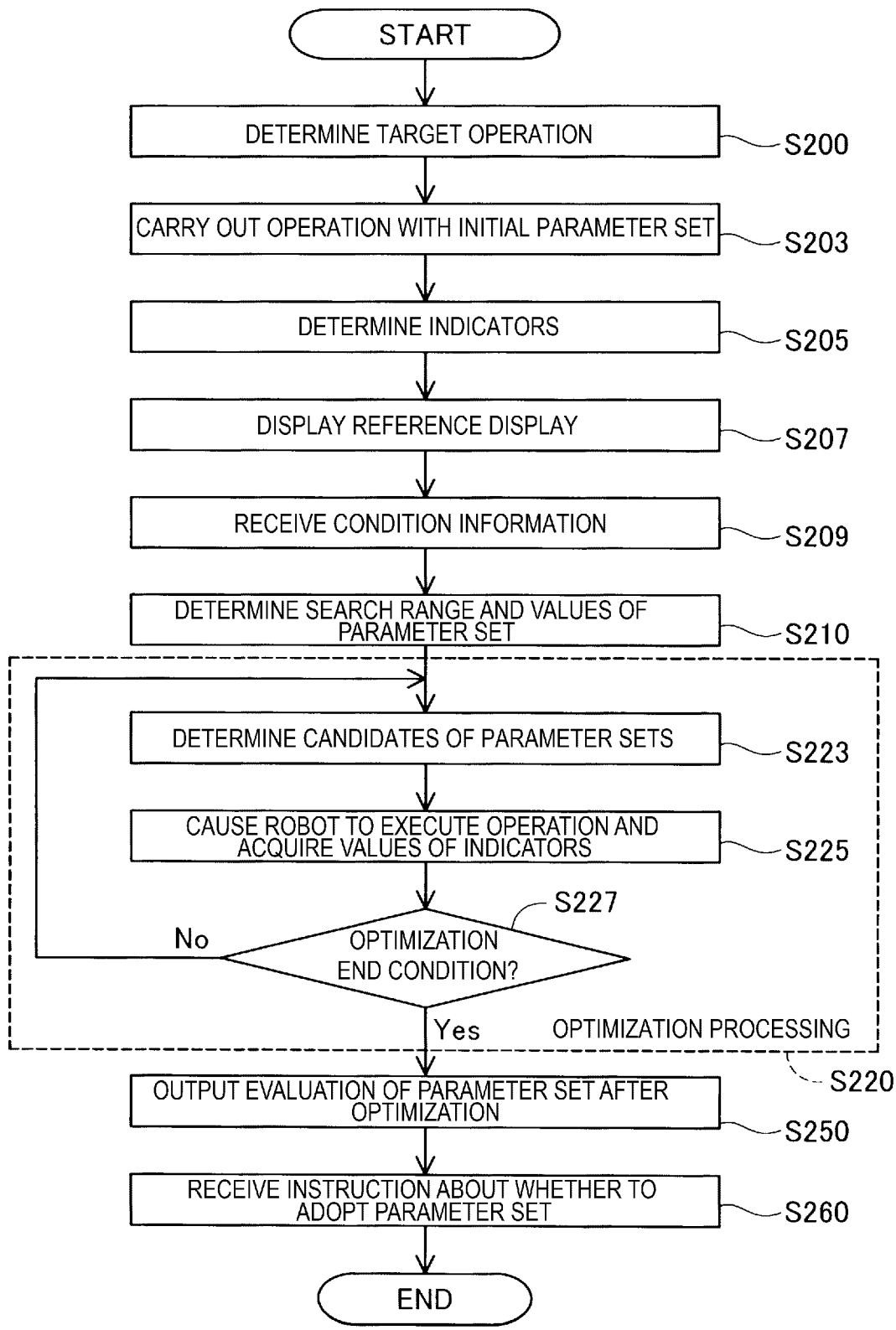
FIG. 7 is a flowchart showing a method of supporting adjustment of parameter sets of the robots.

A4. Optimization processing for parameters (1) Flow of the Optimization Processing for Parameters FIG. 7 is a flowchart showing a method of supporting adjustment of parameter sets of the robots 1 to 3. In this embodiment, prior to operation of the robots 1 to 3, the parameters representing the acceleration and deceleration characteristics and the parameters representing the servo gains among the operation parameters 44c are optimized (see FIG. 3). A set of values of these parameters is referred to as "parameter set" in this specification. Processing shown in FIG. 7 is executed by the CPU 610 of the setting device 600 (see the lower right part of FIG. 1 and FIG. 6).

In step S200, the CPU 610 determines, according to an instruction from a user, an operation for optimizing the acceleration and deceleration characteristics and the servo gains. Specifically, the CPU 610 receives, from the control device 40, the robot program 44b for specifying a track of the operation instructed from the user and the initial parameters 44p and stores the robot program 44b and the initial parameters 44p in the RAM 630. In the robot program 44b, information such as a start point and an end point is already specified. It is assumed that an operation for moving the target object W held by the gripper 23 of the robot 3 from a certain point to another point is determined as an optimizing operation (see FIG. 1).

A functional section of the CPU 610 that receives the robot program 44b in step S200 is shown as a "track receiving section 615" in FIG. 6 (see a lower center part of FIG. 6). A robot program stored in the RAM 630 is shown as a robot program 630c (see an upper left part of FIG. 6). Initial parameters stored in the RAM 630 are shown as initial parameters 630d (see a middle left part of FIG. 6). The initial parameters 44p received from the control device 40 include high-speed parameters 44p1, standard parameters 44p2, and high-accuracy parameters 44p3 (see the lower left part of FIG. 2). The high-speed parameters, the standard parameters, and the high-accuracy parameters stored in the RAM 630 are respectively shown as high-speed parameters 630e, standard parameters 630f, and high-accuracy parameters 630g in FIG. 6 (see the middle left part of FIG. 6).

In step S203 in FIG. 7, the CPU 610 acquires values of various indicators obtained when the CPU 610 causes the robot 3 to execute, according to an instruction to adjust a parameter set, a target operation using the initial parameters 630d. Specifically, the instruction to adjust a parameter set is input to the CPU 610 from the user via the keyboard 604 and the mouse 605. According to the instruction, the CPU 610 executes an operation by the robot 3 according to the robot program 630c acquired in step S200 and a parameter set of the standard parameters 630f among the initial parameters 630d. During the execution of the operation, outputs of the encoders E1 to E6 and the acceleration sensor S1 are acquired. Values of various indicators such as an operation time and an overshoot amount explained below are acquired. For example, it is assumed that the overshoot amount is 0.20 mm.

A functional section of the CPU 610 that causes the robot to execute the operation in step S203 is shown as an "operation executing section 611" in FIG. 6 (see an upper center part of FIG. 6). A functional section of the CPU 610 that acquires values of various indicators about the operation of the robot is shown as "evaluating section 613" in FIG. 6 (see a middle center part of FIG. 6).

In step S205 in FIG. 7, the CPU 610 determines two indicators for evaluating a control result of the robot 3, the two indicators being a first indicator and a second indicator having a tendency that, when one of the first indicator and the second indicator is superior, the other is inferior. Specifically, the determination of the first indicator and the second indicator is performed according to an instruction from the user. The first indicator and the second indicator are determined out of indicators explained below.

(1-1) Operation Time

An operation time is a required time from a start to an end of an operation. In certain control, as the operation time is shorter, evaluation of the control is higher. The operation time can be determined based on target positions of the TCP at a start time and an end time of the operation and positions at respective times of the TCP obtained from the encoders E1 to E6 (see an upper part of FIG. 2). A functional section of the CPU 610 that measures the operation time is shown as an "operation-time measuring section 613a" in FIG. 6 (see the middle center part of FIG. 6). Average operation velocity can also be adopted as an indicator. The average operation velocity is obtained as an operation time.

(1-2) Overshoot Amount

An overshoot amount is a maximum value of positional deviation of the TCP at the end time of the operation. In certain control, as the overshoot amount is smaller, evaluation of the control is higher.

Figure 8:
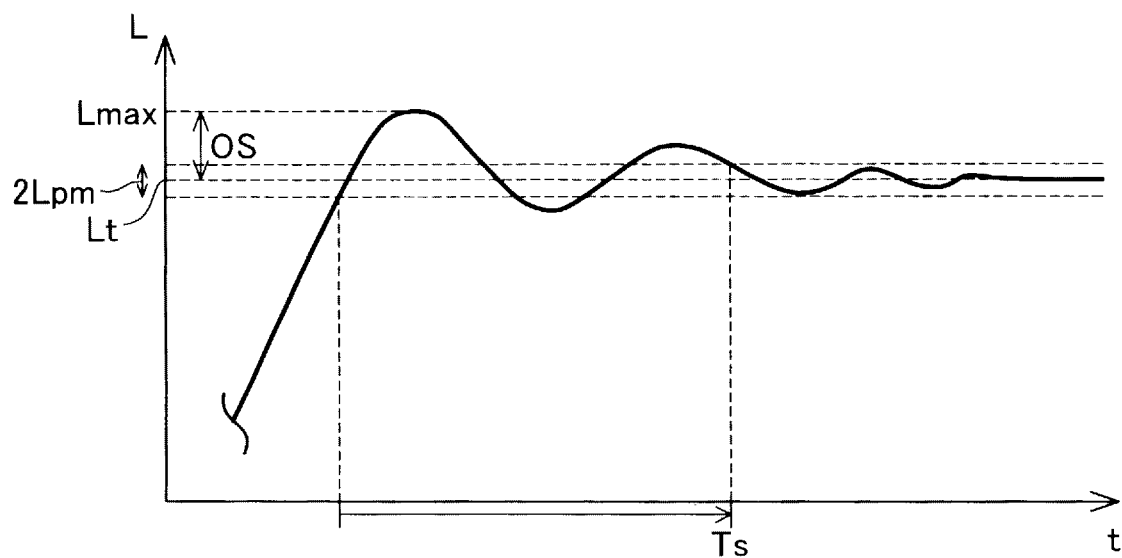
FIG. 8 is a graph showing a position of the TCP at an end time of an operation.

FIG. 8 is a graph showing the position of the TCP at the end time of the operation. An overshoot amount OS is measured as deviation between the target position Lt and an overshoot Lmax of the TCP of the robot. The positional deviation of the TCP can be determined based on the target position Lt of the TCP at the end time of the operation, a position L of the TCP before and after the end time of the operation obtained from the encoders E1 to E6 (see the upper part of FIG. 2), and an output of the acceleration sensor S1 provided at the distal end of the arm of the robot. A functional section of the CPU 610 that measures the overshoot amount is shown as an "overshoot-amount measuring section 613b" in FIG. 6 (see the middle center part of FIG. 6).

(1-3) Vibration Amount after the End of the Operation

A vibration amount is evaluated by a total of absolute values of overshooting amounts from a target position until time Ts when the positional deviation of the TCP after the end of the operation reaches a predetermined value Lpm or less. In certain control, as the vibration amount after the end of the operation is smaller, evaluation of the control is higher. A functional section of the CPU 610 that measures the vibration amount is shown as a "vibration-amount measuring section 613c" in FIG. 6 (see the middle center part of FIG. 6).

(1-4) Noise Level

A noise level is the magnitude of sound that occurs when the robot executes the operation. In certain operation, as the noise level is smaller, evaluation of the control is higher.

Figure 9:
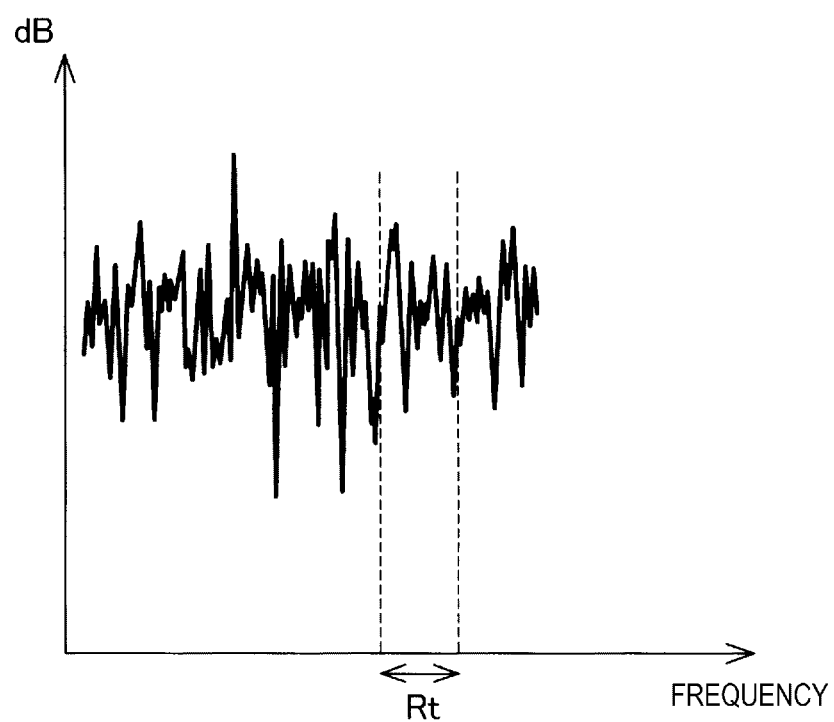
FIG. 9 is a graph representing, with a frequency plotted on the horizontal axis, the magnitude (dB) of sound that occurs when a robot executes an operation.

FIG. 9 is a graph representing, with a frequency plotted on a horizontal axis, the magnitude (dB) of sound that occurs when the robot executes the operation. The noise level can be determined as explained below. Sound is collected by microphones provided near the robots. The noise level can be determined based on the magnitude, that is, an energy amount of the sound included in a predetermined frequency band Rt. By deciding an evaluation indicator of "the magnitude of sound", parameters can be set to suppress sound unpleasant for the user. A functional section of the CPU 610 that measures the noise level is shown as a "noise-level measuring section 613d" in FIG. 6 (see the middle center part of FIG. 6).

(1-5) Estimated Life

An estimated life L is calculated according to the following expression (Eq3). In certain control, as the estimated life is larger, evaluation of the control is higher.

$$L = L_1 K_1 / (K_2)^3 \cdot f \tag{Eq3}$$

$L_1$: Rated life time [hour]
$K_1$: Rotating speed coefficient
  $K_1$=reference input rotating speed/input rotating speed in use
$K_2$: Load ratio
  $K_2$=torque in use/allowable torque
  f: Load type coefficient

TABLE 1

| Type of load | Example | Load type coefficient f |
|---|---|---|
| Uniform load | One direction continuous operation Driving with less load fluctuation such as a belt conveyor or film winding Frequent start and stop | 1.0 |
| Light shock | Positioning control and the like for an inertial body by cam driving or a stepping motor Frequent instantaneous regular and reverse operations and start and stop of a reversible motor | 1.5 |
| Medium shock | Frequent instantaneous stop by brake back of an AC motor Frequent instantaneous start and stop by a brush less motor or a servomotor | 2.0 |

A functional section of the CPU 610 that calculates the estimated life is shown as an "estimated-life calculating section 613e" in FIG. 6 (see the middle center part of FIG. 6).

(1-6) Torque Ratio

A torque ratio of each of the motors is obtained by [an average of torque applied to an output shaft during operation]/[a value of allowable torque]. The "allowable torque" is torque that the motor can continuously apply to the output shaft. The "allowable torque" is decided for each of the motors. "An average of torque applied to the output shaft during operation" can be determined based on an output of the ammeter that measures electric current flowing to the motor M1 to M6. In certain control, as the torque ratio is smaller, evaluation of the control is higher. A functional section of the CPU 610 that calculates the torque ratio is shown as a "torque-ratio calculating section 613f" in FIG. 6 (see the middle center part of FIG. 6).

The operation-time measuring section 613a, the overshoot-amount measuring section 613b, the vibration-amount measuring section 613c, the noise-level measuring section 613d, the estimated-life calculating section 613e, and the torque-ratio calculating section 613f shown in FIG. 6 as the functional sections of the CPU 610 are parts of the evaluating section 613 that acquires values of various indicators about the operation of the robot (see the middle center part of FIG. 6).

In step S205 in FIG. 7, the CPU 610 determines the first indicator and the second indicator for evaluating the control result of the robot 3.

Figure 10:
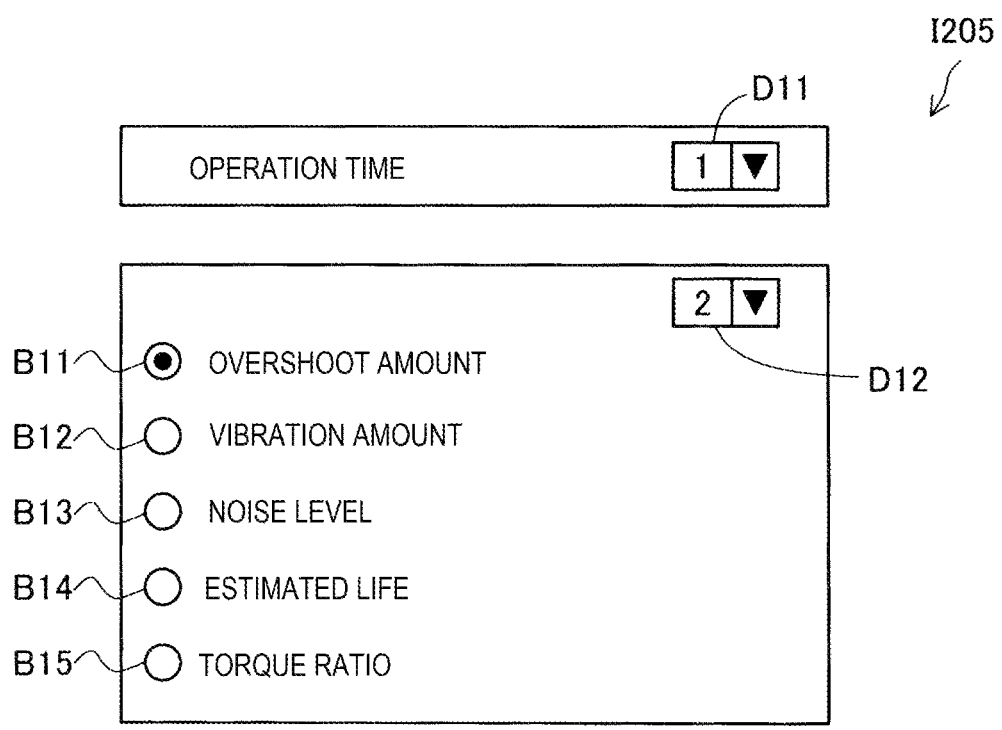
FIG. 10 is a diagram showing a user interface screen displayed on a display of the setting device in step S205 in FIG. 7.

FIG. 10 is a diagram showing a user interface screen I205 displayed on the display 602 of the setting device 600 in step S205 in FIG. 7. The user interface screen I205 includes buttons B11 to B15 and selection windows D11 and D12.

In the user interface screen I205, three or more indicators for evaluating a control result of the robot 3 are displayed on the display 602. More specifically, the operation time is displayed in an upper part. The overshoot amount, the vibration amount, the noise level, the estimated life, and the torque ratio are displayed in a lower part. The overshoot amount, the vibration amount, the noise level, the estimated life, and the torque ratio are indicators having a tendency that, when evaluation of the overshoot amount, the vibration amount, the noise level, the estimated life, and the torque ratio is superior, the operation time is inferior, that is, the operation time increases. That is, the overshoot amount, the vibration amount, the noise level, the estimated life, and the torque ratio and the operation time are indicators that are in a tradeoff relation with each other.

The user can select "1" or "2" in the selection window D11. When selecting the operation time as the first indicator, the user selects "1" in the selection window D11. When selecting the operation time as the second indicator, the user selects "2" in the selection window D11.

The user can select one indicator out of the overshoot amount, the vibration amount, the noise level, the estimated life, and the torque ratio by selecting any one of the buttons B11 to B15 on the user interface screen I205.

The user can select "1" or "2" in the selection window D12. When selecting the indicator selected by any one of the buttons B11 to B15 as the first indicator, the user selects "1" in the selection window D12. When selecting the indicator selected by any one of the buttons B11 to B15 as the second indicator, the user selects "2" in the selection window D12.

When "1" is selected in the selection window D11, "2" is automatically selected in the selection window D12. When "2" is selected in the selection window D11, "1" is automatically selected in the selection window D12. When "1" is selected in the selection window D12, "2" is automatically selected in the selection window D11. When "2" is selected in the selection window D12, "1" is automatically selected in the selection window D11. A functional section of the CPU 610 that controls display of the display 602 and displays the user interface screen is shown as a "display control section 614" in FIG. 6 (see the lower center part of FIG. 6).

The CPU 610 determines, according to an instruction from the user, the first indicator and the second indicator out of the three or more indicators displayed on the user interface screen I205. In an example shown in FIG. 10, the operation time is selected as the first indicator used for the evaluation of the parameter set and the overshoot amount is selected as the second indicator used for the evaluation of the parameter set. Accordingly, the operation time is determined as the first indicator and the overshoot amount is determined as the second indicator. A functional section of the CPU 610 that realizes the processing for determining an indicator in step S205 is shown as an "indicator determining section 612a" in FIG. 6 (see the upper center part of FIG. 6).

By performing such processing, in later step S250, a parameter set that can realize performance reflecting an intention of the user can be presented to the user.

In step S207 in FIG. 7, the CPU 610 performs reference display based on values of the overshoot amount serving as the second indicator acquired about the parameter set of the initial parameters. Specifically, a user interface screen I207 is displayed on the display 602.

Figure 11:
FIG. 11 is a diagram showing a user interface screen displayed on the display of the setting device in step S207 in FIG. 7.

FIG. 11 is a diagram showing the user interface screen I207 displayed on the display 602 of the setting device 600 in step S207 in FIG. 7. The user interface screen I207 is a user interface screen for receiving condition information. The "condition information" is information for deciding conditions for optimization processing for a parameter set for controlling a target operation, a track of which is specified by the robot program 630c. The user interface screen I207 includes displays L71 to L73 of operation modes and buttons B71 to B73.

The buttons B71 to B73 are buttons for selecting the operation modes represented by the displays L71 to L73. The buttons B71 to B73 are configured such that only one of the buttons B71 to B73 can be selected.

The displays L71 to L73 of the operation modes represent three operation modes. The operation modes represented by the displays L71 to L73 are operation modes corresponding to candidates of three kinds of condition information having different degrees about the overshoot amount, which is the second indicator. The three operation modes represented by the displays L71 to L73 are specifically, when compared with the standard parameters 630f among the initial parameters 630d, a first mode for allowing vibration, a third mode for reducing vibration, and a second mode having an intermediate characteristic of the first mode and the third mode (see a left part of FIG. 11).

The displays L71 to L73 of the operation modes include reference displays R71 to R73. The reference displays R71 to R73 are displayed based on the values of the overshoot amount acquired about the standard parameters 630f among the initial parameters 630d in step S203.

The reference displays R71 to R73 indicate candidates of condition information. In this embodiment, the condition information is a restriction value for the optimization processing. The restriction value specifically represents an upper limit value of the overshoot amount in the optimization processing. The reference display R72 indicates, as a candidate of the restriction value, the value of 0.20 mm of the overshoot amount acquired in step S203. The reference display R71 indicates, as a candidate of the restriction value, a value 1.5 times as large as the value of 0.20 mm of the overshoot amount acquired in step S203. The reference display R73 indicates, as a candidate of the restriction value, a value 0.5 times as large as the value of 0.20 mm of the overshoot amount acquired in step S203.

By performing such processing, candidates of a realistic plurality of kinds of condition information based on the values of the overshoot amount acquired using the standard parameters 630f can be presented to the user as the reference displays R71 to R73. Accordingly, after viewing the reference displays R71 to R73 based on the values of the overshoot amount OS obtained when the standard parameters 630f are used, the user can input, in later step S209, realistic condition information enough for obtaining a solution in the optimization processing. Accordingly, even a user not having sufficient experience in setting of a parameter set can adjust the parameter sets of the robots 1 to 3. When adjusting parameters of the robots 1 to 3 operating in a new environment, the user can adjust the parameter sets of the robots 1 to 3. Further, since the condition information for realistically avoiding an unrealizable range is input, the optimization processing for the parameter set can be efficiently performed.

Upper limits and lower limits of the indicators other than restriction values decided by the condition information are decided in advance and stored in the storing section 44 of the control device 40. The CPU 610 reads out the upper limits and lower limits of the indicators stored in the storing section 44 and uses the upper limits and the lower limits in the optimization processing in step S220.

The first mode represented by the display L71 of the operation mode is associated with the high-speed parameters 630e among the initial parameters 630d (see a right part of FIG. 11 and the middle left part of FIG. 6). The third mode represented by the display L73 of the operation mode is associated with the high-accuracy parameters 630g among the initial parameters 630d. The second mode represented by the display L72 of the operation mode is associated with the standard parameters 630f among the initial parameters 630d.

In step S209 in FIG. 7, the CPU 610 receives condition information concerning the overshoot amount OS, which is the second indicator. Specifically, the CPU 610 receives condition information by receiving selection out of the displays L71 to L73 of the three operation modes by the buttons B71 to B73 of the user interface screen I207.

When the button B71 is selected, the first mode represented by the display L71 of the operation mode is input as the condition information. When the button B72 is selected, the second mode represented by the display L72 of the operation mode is input as the condition information. When the button B73 is selected, the third mode represented by the display L73 of the operation mode is input as the condition information. The received condition information is stored in the RAM 630. The condition information stored in the RAM 630 is shown as condition information 630b in FIG. 6 (see the upper left part of FIG. 6). A functional section of the CPU 610 that receives the condition information is shown as a "condition receiving section 617" in FIG. 6 (see the lower center part of FIG. 6).

By performing such processing, the user can input condition information by selecting one candidate out of candidates of a plurality of kinds of condition information based on the values of the overshoot amount acquired in step S203. Accordingly, even a user not having sufficient experience in setting of a parameter set can input realistic condition information about the overshoot amount.

An operation time OT serving as the first indicator and the overshoot amount OS serving as the second indicator have a tendency that, when one of the operation time OT and the overshoot amount OS is superior, the other is inferior. Accordingly, the candidates of the three kinds of condition information, the overshoot amounts of which are different, indicated by the displays L71 to L73 of the operation modes include an operation mode corresponding to condition information for prioritizing the operation time OT and an operation mode corresponding to condition information for prioritizing the overshoot amount OS (see L71 and L73 in FIG. 11). Accordingly, the user can easily input the condition information while reflecting an intention of the user through selection of a presented plurality of operation modes.

In steps S210 and S220 in FIG. 7, the optimization processing for the parameter set is performed according to the input condition information 630b. Values of a new parameter set are determined.

In step S210, the CPU 610 determines, based on the condition information 630b received in step S209, a search range of the optimization processing and a parameter set used for a search. Specifically, the CPU 610 determines the search range of the optimization processing using a restriction value represented by the condition information 630b received in step S209. The CPU 610 determines, as the parameter set used for the search, a parameter set associated with the condition information 630b received in step S209. In an example shown in FIG. 11, the display L73 of the operation mode is selected by the button B73. Accordingly, a range in which the overshoot amount is equal to or smaller than 0.10 mm is determined as the search range of the optimization processing (see a lower center part of FIG. 11). The high-accuracy parameters 630g among the initial parameters 630d are determined as a parameter set serving as an initial solution used for the search (see a lower right part of FIG. 11).

In step S220, the CPU 610 performs the optimization processing using the search range decided in step S210 and the parameter set and determines value of a new parameter set. An optimization problem of the parameter set is formulated as follows as a constrained nonlinear optimization problem.

Minimize: $T(x)$ s.t. $O(x) - O\text{const} \leq 0$ where x is a vector of a parameter set including a plurality of parameters, $T(x)$ is the operation time, $O(x)$ is the overshoot amount, Oconst is the restricted value of the overshoot amount, and Oconst represents the search range of the optimization processing determined in step S210.

An objective function f(x) for optimization is defined as follows using a penalty function method. Optimization by an optimization algorithm is performed.

$$f(x) = T(x) + \lambda \cdot \max(0, O(x) - Oconst)^2 \quad \text{(Eq4)}$$

where $\lambda$ is a constant.

As a result, a parameter set in which the restriction of the overshoot amount determined in step S210 is satisfied and the operation time is minimized is obtained.

In this embodiment, in step S220, the optimization processing for minimizing the objective function f(x) is performed by CMA-ES (Covariance Matrix Adaptation Evolution Strategy).

In step S223, the CPU 610 decides an initial value m(0) of an average vector, an initial value G(0) of a step size, and an initial value C(0) of a covariance matrix. The initial value m(0) of the average vector is the parameter set determined in step S210. The initial value G(0) of the step size and the initial value C(0) of the covariance matrix are decided in advance. The CPU 610 determines, based on the initial value m(0) of the average vector and the initial value C(0) of the covariance matrix, candidates xi of a plurality of parameter sets around the initial value m(0) of the average vector. A functional section of the CPU 610 that realizes the processing in first step S223 after the processing in step S210 is shown as an "initial-condition determining section 612*d*" in FIG. 6 (see the middle center part of FIG. 6).

In step S225, the CPU 610 acquires values of the first indicator and the second indicator obtained when the CPU 610 causes the robot 3 to execute an operation based on the parameter set determined in step S210. Specifically, the CPU 610 calculates an objective function f(xi) about each of the candidates xi of the plurality of parameter sets. First, the CPU 610 executes the operation determined in step S200 according to the candidate xi of the parameter set determined in step S223. The CPU 610 acquires an operation time T(xi), which is the first indicator, and an overshoot amount O(xi), which is the second indicator. The CPU 610 calculates the objective function f(xi) from the acquired operation time T(xi) and the acquired overshoot amount O(xi). A functional section of the CPU 610 that causes the robot to execute the operation in step S220 is the "operation executing section 611" (see the upper center part of FIG. 6). A functional section of the CPU 610 that evaluates the operation of the robot and acquires the first indicator and the second indicator in step S220 is the "evaluating section 613" (see a middle center part of FIG. 11).

In step S227, the CPU 610 determines whether an end condition for the optimization is satisfied. Specifically, the CPU 610 determines whether the processing in steps S223 to S225 is executed a predetermined number of times. When the processing in steps S223 to S225 is executed the predetermined number of times, the CPU 610 determines that the end condition for the optimization is satisfied.

When the end condition for the optimization is satisfied in step S227, the CPU 610 selects a parameter set having a most excellent value of the objective function f(xi) out of the candidates xi of the plurality of parameter sets and stores the selected parameter set in the RAM 630. The processing proceeds to S250. The selected parameter set is a parameter set more excellent in the operation time OT serving as the first indicator than the parameter set determined in step S210. Parameters including the selected parameter set are shown in FIG. 6 as parameters 630*a* (see the upper left part of FIG. 6).

On the other hand, when the end condition for the optimization is not satisfied in step S227, the CPU 610 increases a count of the number of times of repetition of the processing. The processing returns to S223. In step S223 executed subsequently to step S227, the CPU 610 determines a new parameter set based on the value of the first indicator and the value of the second indicator acquired in the immediately preceding step S225. Specifically, the CPU 610 determines an evolution path based on the objective function f(xi) of the candidates xi of the plurality of parameter sets acquired in the immediately preceding step S225 and determines a new average vector m(t+1), a new step size σ(t+1), and a new covariance matrix C(t+1) based on the evolution path. The CPU 610 determines the candidates xi of the plurality of parameter sets around the average vector m(t+1) based on the average vector m(t+1) and the covariance matrix C(t+1). A functional section of the CPU 610 that realizes the processing in step S223 executed subsequently to step S227 is shown as a "new-parameter determining section 612*b*" in FIG. 6 (see the upper center part of FIG. 6).

The CPU 610 repeatedly executes the processing in steps S223 and S225 until the condition in step S227 is satisfied. As a result, a parameter set more excellent about the operation time OT serving as the first indicator than the parameter set determined first in step S210 is acquired. A functional section of the CPU 610 that repeats the processing in steps S223 and S225 and determines a parameter set having the most excellent value of the objective function f(xi) in step S227 is shown as a "parameter acquiring section 612*c*" in FIG. 6 (see the middle center part of FIG. 6). A functional section of the CPU 610 including the indicator determining section 612*a*, the new-parameter determining section 612*b*, the parameter acquiring section 612*c*, and the initial-condition determining section 612*d* is shown as a "parameter searching section 612" in FIG. 6 (see the upper center part of FIG. 6).

In the CMA-ES, the quality of a solution finally obtained tends to depend on the quality of the initial value m(0) of the average vector. However, in this embodiment, the initial value m(0) of the average vector is set as a general-purpose parameter set subjected to the optimization processing about a large number of operations in advance (see 44*p* in FIGS. 2 and 630*d* in FIG. 6). Accordingly, possibility that a parameter set excellent about the first indicator can be improved by the optimization processing by the CMA-ES.

Figure 12:
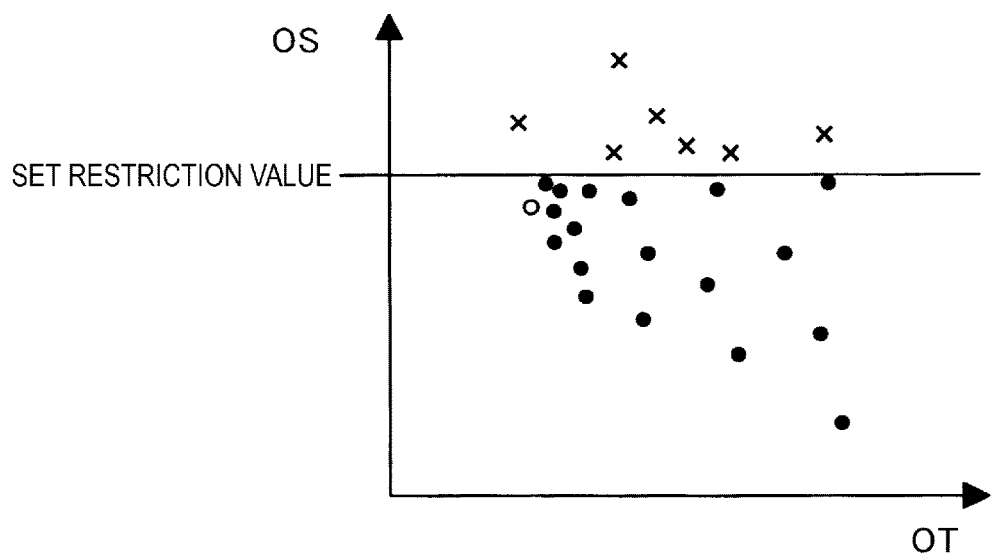
FIG. 12 is a scatter diagram showing a value of an operation time and a value of an overshoot amount of a parameter set obtained by repetition of processing in steps S223, S225, and S227.

FIG. 12 is a scatter diagram showing values of the operation time OT and values of the overshoot amount OS of the parameter set obtained by the repetition of the processing in steps S223, S225, and S227. X represents parameter sets having overshoot amounts larger than the restriction value decided in step S210 in FIG. 7. Black circles represent parameter sets having overshoot amounts smaller than the restriction value. A white circle represents a parameter set having an overshoot amount smaller than the restriction value and the smallest operation time OT. The parameter set represented by the white circle is an optimum solution for minimizing the operation time OT among solutions satisfying the condition specified by the restriction value received in step S209 (see 630*a* in FIG. 6).

In this embodiment, the user can input the condition information 630*b* about the overshoot amount after viewing the reference displays R71 to R73 based on the values of the overshoot amount obtained when the standard parameters 630*f*, which are the initial parameters 630*d*, are used (FIG.

11). Accordingly, even a user not having sufficient experience in setting of a parameter set can easily adjust the parameter sets of the robots 1 to 3.

In this embodiment, the search range of the optimization processing and the initial solution of the parameter set are determined based on the received condition information (see L73 in FIG. 11 and S210 in FIG. 7). Accordingly, compared with a form in which the initial solution of the parameter set is determined at random, a parameter set meeting the intention of the user can be obtained in a shorter time.

In step S250 in FIG. 7, the CPU 610 performs, about the parameter set stored in the RAM 630, that is, the parameter set, which is the optimum solution, satisfying the condition specified by the restriction value, display based on the value of the first indicator and the value of the second indicator of the parameter set on the display 602 (see 630a in FIG. 6).

Figure 13:
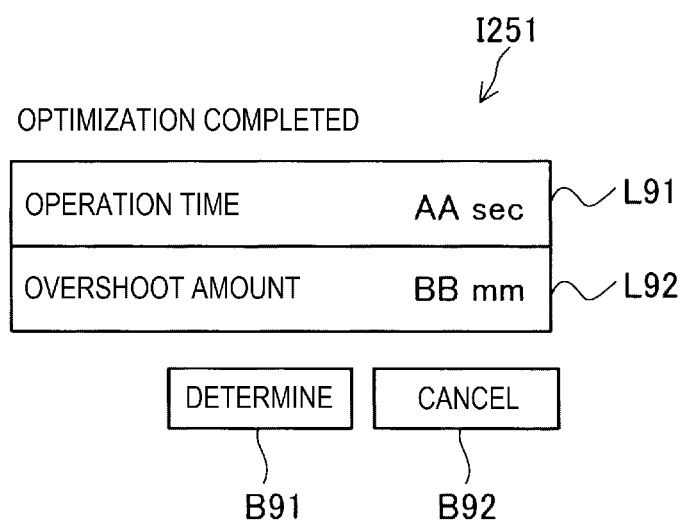
FIG. 13 is a diagram showing a user interface screen displayed in step S250.

FIG. 13 is a diagram showing a user interface screen I251 displayed in step S250. The user interface screen I251 includes displays L91 and L92 and buttons B91 and B92. The display L91 is display representing the operation time OT of the parameter set obtained by the optimization processing. The display L92 is display representing the overshoot amount OS of the parameter set obtained by the optimization processing. The button B91 is a button for adopting the parameter set obtained by the optimization processing. The button B92 is a button for ending the processing without adopting the parameter set obtained by the optimization processing.

In step S260 in FIG. 7, the CPU 610 receives, from the user, an instruction about whether to adopt the parameter set obtained by the optimization processing. When ending the processing without adopting the parameter set obtained by the optimization processing, the user presses the button B92. When the button B92 is pressed, the parameter set subjected to the optimization processing is discarded and the processing ends.

When adopting the parameter set obtained by the optimization processing, the user presses the button B91. When the button B91 is pressed, the parameter set subjected to the optimization processing is transmitted from the setting device 600 to the control device 40 and stored in the storing section 44 (see 44a in FIG. 2). The robot 3 is controlled by the parameters 44a of the parameter set and the robot program 44b.

In this embodiment, the operation set as the target of adjustment of the parameter set is referred to as "target operation" as well. The robot program 44b and the robot program 630c are referred to as "track information" as well. The display 602 is referred to as "display section" as well. The high-speed parameters 44p1, the standard parameters 44p2, and the high-accuracy parameters 44p3 stored in the storing section 44 and the high-speed parameters 630e, the high-accuracy parameters 630g, and the standard parameters 630f stored in the RAM 630 are referred to as "initial parameter set" as well. The indicators such as operation time, the overshoot amount, the vibration amount, the noise level, the estimated life, and the torque ratio are referred to as "evaluation indicators" as well.

The setting device 600 in this embodiment is referred to as "information processing device" as well. The evaluating section 613 of the CPU 610 that realizes the function of step S203 in FIG. 7 is referred to as "initial evaluation section" as well. The processing for acquiring, in step S225 in FIG. 7, values of the first indicator and the second indicator obtained when the CPU 610 causes the robot 3 to perform an operation is referred to as "evaluation processing" as well. The processing for determining, in step S223 executed subsequently to step S227, a new parameter set based on the value of the first indicator and the value of the second indicator acquired in the immediately preceding step S225 is referred to as "new parameter determination processing" as well.

B. Second Embodiment

A second embodiment is different from the first embodiment in specific processing in steps S203, S207, S209, and S210 in FIG. 7. Otherwise, the second embodiment is the same as the first embodiment.

In the second embodiment as well, in step S203 in FIG. 7, according to an instruction to adjust a parameter set, the CPU 610 acquires values of various indicators obtained when the CPU 610 causes the robot 3 to execute a target operation using the initial parameters 630d. However, the CPU 610 acquires, about the robot program 630c and three sets of the initial parameter sets 44p1 to 44p3 prepared in advance, values of various indicators obtained when the CPU 610 causes the robot 3 to execute an operation using the respective initial parameter sets 44p1 to 44p3.

Specifically, in the second embodiment, the operations by the robot 3 are executed using the high-speed parameters 630e, the standard parameters 630f, and the high-accuracy parameters 630g of the initial parameters 630d. During the execution of the operations, outputs of the encoders E1 to E6 and the acceleration sensor S1 are acquired. Values of various indicators such as an operation time and an overshoot amount are acquired.

A functional section of the CPU 610 that causes the robot to execute an operation in step S203 is the operation executing section 611 (see the upper center part of FIG. 6). A functional section of the CPU 610 that acquires values of various indicators about the operation of the robot is the evaluating section 613 (see the middle center part of FIG. 6).

In step S207 in FIG. 7, the CPU 610 displays, on the display 602, reference displays R74a to R76a and R74b to R76b based on values of the operation time OT and values of the overshoot amount OS acquired about the three sets of the initial parameter sets 44p1 to 44p3.

FIG. 14 is a diagram showing a user interface screen I207b displayed on the display 602 of the setting device 600 in step S207 in the second embodiment. The user interface screen I207b is a user interface screen for receiving condition information. The user interface screen I207b includes displays R74 to L76 of operation modes and buttons B74 to B76.

The buttons B74 to B76 are buttons for selecting the operation modes represented by the displays L74 to L76. The buttons B74 to B76 are configured such that only one of the buttons B74 to B76 can be selected.

The displays L74 to L76 of the operation modes represent three operation modes. The three operation modes represented by the displays L74 to L76 are specifically a high-speed mode for allowing vibration, a high-accuracy mode for reducing vibration, and a normal mode having an intermediate characteristic of the high-speed mode and the high-accuracy mode (see a left part of FIG. 14).

The high-speed mode represented by the display L74 of the operation mode is associated with the high-speed parameters 630e. The high-accuracy mode represented by the display L76 of the operation mode is associated with high-accuracy parameters 630g. The normal mode represented by the display L75 of the operation mode is associated with the standard parameters 630f.

The displays L71 to L73 of the operation modes include reference displays R74a to R76a and R74b to R76b. The reference displays R74a and R74b are respectively displays based on the values of the operation time and the overshoot amount acquired about the high-speed parameters 630e among the initial parameters 630d in step S203. Reference displays R75a and R75b are respectively displays based on the values of the operation time and the overshoot amount acquired about the standard parameters 630f among the initial parameters 630d in step S203. The reference displays R76a and R76b are respectively displays based on the values of the operation time and the overshoot amount acquired about the high-accuracy parameters 630g among the initial parameters 630d in step S203. That is, the reference displays R74a to R76a and R74b to R76b display values of the first indicator and the second indicator obtained when the respective initial parameter sets are used.

By performing such display, the user can input the condition information about the operation time and the overshoot amount after viewing the reference displays R74a to R76a and R74b to R76b based on the values of the operation time serving as the first indicator and the values of the overshoot amount serving as the second indicator of the plurality of initial parameter sets 44p1 to 44p3 (see B74 to B76 in FIG. 14). Accordingly, even a user not having sufficient experience in setting of a parameter set can adjust the parameter sets of the robots 1 to 3 reflecting a desire of the user about the first indicator and the second indicator.

The reference displays R74a to R76a and R74b to R76b are reference displays about all the initial parameter sets 44p1 to 44p3 used in the execution of the operation in step S203. Accordingly, the user can input the condition information 630b about the operation time and the overshoot amount out of a variety of choices after viewing the reference displays R74a to R76a and R74b and R76b based on the values of the operation time OT and the values of the overshoot amount OS of all the initial parameter sets 44p1 to 44p3. Accordingly, flexibility in reflecting a desire about the operation time and the overshoot amount is high.

In step S209 in FIG. 7, the CPU 610 receives condition information. Specifically, the CPU 610 receives condition information by receiving selection out of the displays L74 to L76 of the three operation modes by the buttons B74 to B76 of the user interface screen I207b.

When the button B74 is selected, the high-speed mode represented by the display L74 of the operation mode is input as the condition information. When the button B75 is selected, the normal mode represented by the display L75 of the operation mode is input as the condition information. When the button B76 is selected, the high-accuracy mode represented by the display L76 of the operation mode is input as the condition information.

In step S210 in FIG. 7, the CPU 610 determines, based on the condition information 630b received in step S209, a search range of the optimization processing and a parameter set used for a search. Specifically, the CPU 610 determines the search range of the optimization processing using the restriction value for the second indicator corresponding to the condition information 630b received in step S209. The CPU 610 determines, as the parameter set used for the search, a parameter set used when the operation time and the overshoot amount of the operation mode represented by the condition information 630b received in step S209 are acquired (see S203 in FIG. 7). In an example shown in FIG. 14, the display L74 of the operation mode is selected by the button B74. Accordingly, a range in which the overshoot amount is equal to or smaller than 0.4 mm is determined as the search range of the optimization processing (see an upper right part of FIG. 14). The high-speed parameters 630e among the initial parameters 630d are determined as a parameter set serving as an initial solution used for the search (see an upper left part of FIG. 14).

Even in such a form, even a user not having sufficient experience in setting of a parameter set can input, as the condition information 630b about the operation time and the overshoot amount, realistic and good values of the operation time and the overshoot amount.

C. Third Embodiment

A third embodiment is different from the second embodiment in specific processing in steps S207, S209, and S210 in FIG. 7. Otherwise, the third embodiment is the same as the second embodiment.

FIG. 15 is a diagram showing a user interface screen I207c displayed on the display 602 of the setting device 600 in step S207 in the third embodiment. The user interface screen I207c is a user interface screen for receiving condition information. The user interface screen I207c includes reference displays R77 and R78, input windows D71 and D72, and buttons B77, B78, B81, and B82.

The buttons B77 and B78 are buttons for selecting, from the operation time serving as the first indicator and the overshoot amount serving as the second indicator, an indicator specifying condition information. When desiring to designate, with the operation time, a restriction value for a search serving as condition information, the user selects the button B77. When the button B77 is selected, the input window D72 is grayed out and a value cannot be input to the input window D72. When desiring to designate the restriction value for the search with the overshoot amount, the user selects the button B78. When the button B78 is selected, the input window D71 is grayed out and a value cannot be input to the input window D71.

The reference display R77 is display based on the values of the operation time acquired about the high-speed parameters 630e among the initial parameters 630d in step S203. The reference display R78 is display based on the values of the overshoot amount acquired about the high-accuracy parameters 630g among the initial parameters 630d in step S203. That is, in the third embodiment, the reference displays R77 and R78 in step S207 are displays based on only a best value of the operation time and a best value of the overshoot amount among the values of the operation time and the values of the overshoot amount acquired about the operations by the three sets of initial parameter sets in step S203.

The input window D71 is an interface for receiving an upper limit of the operation time, which is the first indicator, as condition information. When desiring to designate, with the operation time, the restriction value for the search of optimization, the user selects the button B77 and, referring to the value of the operation time shown in the reference display R77, inputs a numerical value desired as the upper limit of the operation time to the input window D71.

The input window D72 is an interface for receiving an upper limit of the overshoot amount, which is the second indicator, as condition information. When desiring to designate, with the overshoot amount, the restriction value for the search of optimization, the user selects the button B78 and, referring to the value of the overshoot amount shown in the reference display R78, inputs a numerical value desired as the upper limit of the overshoot amount to the input window D72.

By performing such display, the user can input realistic condition information 630b about the operation time and the overshoot amount after viewing the reference displays R77 and R78 based on the best values of the operation time and the overshoot amount obtained when the initial parameter sets 44p1 to 44p3 are used (see FIG. 15). Accordingly, even a user not having sufficient experience in setting of a parameter set can input realistic and good values of the operation time and the overshoot amount as the condition information 630b about the operation time and the overshoot amount. Since reference display based on values other than the best values among values of the operation time and the overshoot amount is not performed, the user can easily grasp reference display on the display 602 compared with a form in which reference display is performed about all the indicators.

The button B81 is a button for deciding a value of an indicator input to the input window D71 or the input window D72. The button B82 is a button for discarding the value of the indicator input to the input window D71 or the input window D72 and inputting a value to the input window D71 or the input window D72 again.

In step S209 in FIG. 7, the CPU 610 receives, as condition information, values of the indicator selected by the button B77 or B78 of the user interface screen I207c and the indicator input to the input window D71 or the input window D72.

In step S210 in FIG. 7, the CPU 610 determines a search range of the optimization processing based on the condition information 630b received in step S209. Specifically, the CPU 610 determines the search range of the optimization processing using an indicator represented by the condition information 630b received in step S209 and a value of the indicator. In an example shown in FIG. 15, the button B77 is selected and 1.2 seconds is input to the input window D71. Accordingly, a range in which the operation time is 1.2 seconds or less is selected as the search range of the optimization processing. In the third embodiment, irrespective of an input on the user interface screen I207c, the standard parameters 630f among the initial parameters 630d are determined as a parameter set serving as an initial solution used for the search (see the upper left part of FIG. 6).

In such a form as well, even a user not having sufficient experience in setting of a parameter set can input realistic and good values of the operation time and the overshoot amount as the condition information 630b about the operation time and the overshoot amount.

In this embodiment, the search range of the optimization processing is determined based on a specific value of the restriction value reflecting an intention of the user (see D71 and D72 in FIG. 15). Accordingly, it is more highly likely that a parameter set meeting the intention of the user can be obtained compared with a form in which choices are prepared in advance and the condition information 630b is input according to selection of a choice.

D. Fourth Embodiment

A fourth embodiment is different from the first embodiment in specific processing in steps S207, S209, and S210 in FIG. 7. Otherwise, the fourth embodiment is the same as the first embodiment.

Figure 16:
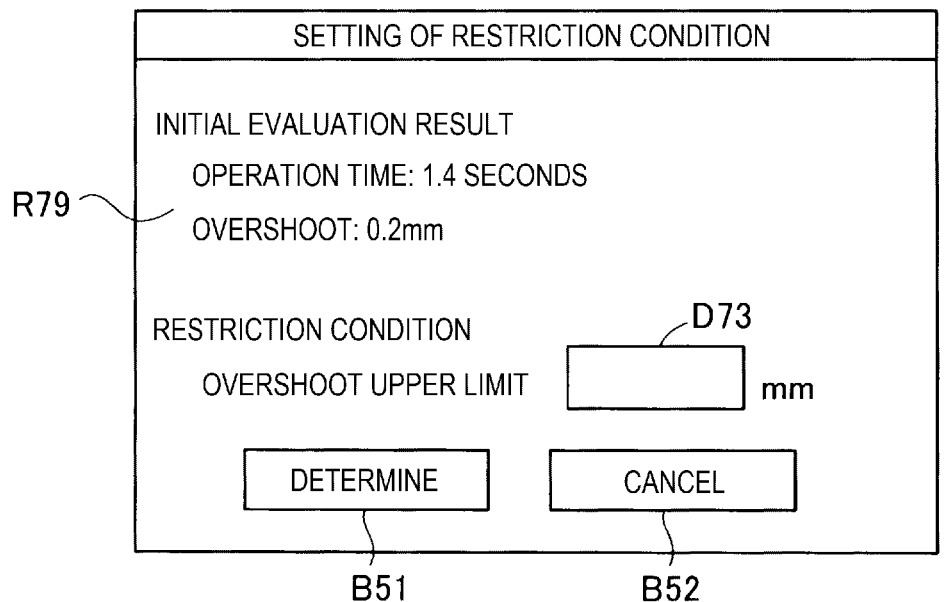
FIG. 16 is a diagram showing a user interface screen displayed on the display of the setting device in step S207 in a fourth embodiment.

FIG. 16 is a diagram showing a user interface screen I207d displayed on the display 602 of the setting device 600 in step S207 in the fourth embodiment. The user interface screen I207d includes reference display R79, an input window D73, and buttons B51 and B52.

The reference display R79 is display representing a value of the operation time and a value of the overshoot amount acquired about the standard parameters 630f among the initial parameters 630d in step S203. Specifically, the reference display R79 shows a value of 1.4 seconds of the operation time and a value of 0.2 mm of the overshoot amount acquired in step S203.

The input window D73 is an interface for receiving, as condition information, an upper limit of the overshoot amount, which is the second indicator. A user refers to the value of the operation time and the value of the overshoot amount shown in the reference display R79 and inputs a numerical value desired as the upper limit of the overshoot amount to the input window D73 via the keyboard 604 and the mouse 605.

The operation time OT serving as the first indicator and the overshoot amount OS serving as the second indicator have a tendency that, when one of the operation time OT and the overshoot amount OS is superior, the other is inferior. Accordingly, the user can easily input condition information while reflecting an intention of the user by determining an upper limit of the overshoot amount referring to the value of the operation time and the value of the overshoot amount shown in the reference display R79. For example, if the user feels that the value of 1.4 seconds of the operation time shown in the reference display R79 is sufficiently short and the value of 0.20 mm of the overshoot amount is large, the user can input a value, for example, 0.15 mm smaller than the value shown in the reference display R79 as the upper limit of the overshoot amount. If the user feels that the value of 1.4 seconds of the operation time shown in the reference display R79 is long and the value of 0.20 mm of the overshoot amount is sufficiently small, the user can input a value, for example, 0.25 mm larger than the value shown in the reference display R79 as the upper limit of the overshoot amount.

The button B51 is a button for deciding the numerical value input to the input window D73. The button B52 is a button for discarding a value of an indicator input to the input window D73 and inputting a value to the input window D73 again.

In step S209 in FIG. 7, the CPU 610 receives condition information concerning the overshoot amount OS, which is the second indicator. Specifically, a restriction value is input to the input window D73 and the button B51 is pressed on the user interface screen I207d, whereby the CPU 610 receives, as the condition information, the restriction value input to the input window D73.

In step S210 in FIG. 7, the CPU 610 determines, based on the condition information 630b received in step S209, a search range of the optimization processing and a parameter set used for a search. Specifically, the CPU 610 determines the search range of the optimization processing using an upper limit value of the overshoot amount received via the input window D73 in step S209. In the fourth embodiment, irrespective of an input on the user interface screen I207d, the CPU 610 determines, as a parameter set serving as an initial solution used for the search, a parameter set decided at random.

In this embodiment as well, the search range of the optimization processing is determined based on the received condition information (see FIG. 16). Accordingly, compared with a form in which the search range of the optimization processing does not reflect an intention of the user, a parameter set meeting the intention of the user can be obtained in a shorter time.

E. Fifth Embodiment

A fifth embodiment is different from the forth embodiment in specific processing in steps S207, S209, and S210 in FIG. 7. Otherwise, the fifth embodiment is the same as the fourth embodiment.

Figure 17:
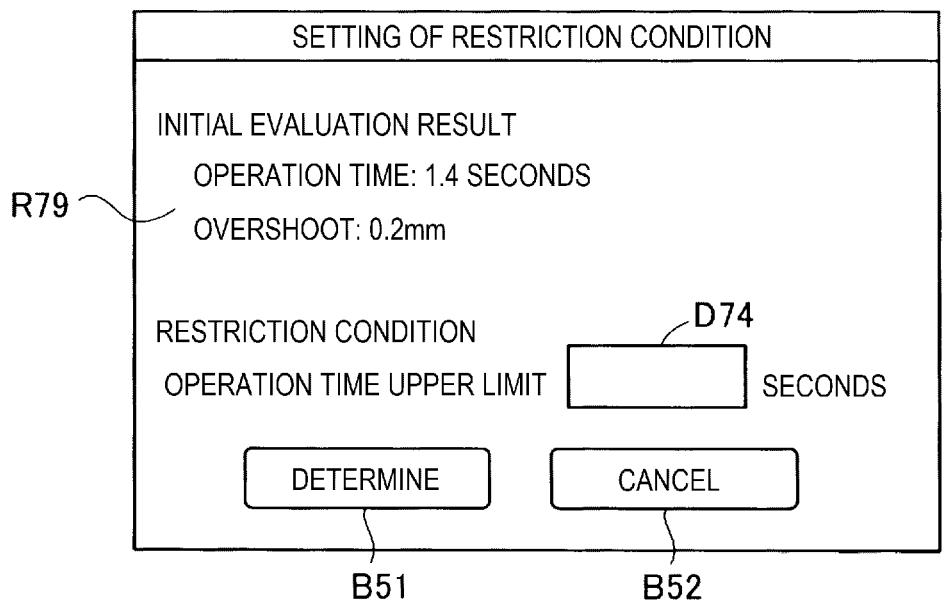
FIG. 17 is a diagram showing a user interface screen displayed on the display of the setting device in step S207 in a fifth embodiment.

FIG. 17 is a diagram showing a user interface screen I207e displayed on the display 602 of the setting device 600 in step S207 in the fifth embodiment. The user interface screen I207e includes the reference display R79, an input window D74, and the buttons B51 and B52.

The reference display R79 is the same as the reference display R79 in the fourth embodiment shown in FIG. 16. The buttons B51 and B52 are the same as the buttons B51 and B52 in the fourth embodiment shown in FIG. 16.

The input window D74 is an interface for receiving, as condition information, an upper limit of the operation time, which is the first indicator. A user inputs a numerical value desired as the upper limit of the operation time to the input window D74 via the keyboard 604 and the mouse 605 referring to a value of the operation time and a value of the overshoot amount shown in the reference display R79.

For example, if the user feels that the value of 1.4 seconds of the operation time shown in the reference display R79 is sufficiently short and the value of 0.20 mm of the overshoot amount is large, the user can input, as the upper limit of the operation time, a value, for example, 1.6 seconds larger than the value shown in the reference display R79. If the user feels that the value of 1.4 seconds of the operation time shown in the reference display R79 is long and the value of 0.20 mm of the overshoot amount is sufficiently small, the user can input, as the upper limit of the operation time, a value, for example, 1.2 seconds smaller than the value shown in the reference display R79.

In step S209 in FIG. 7, the CPU 610 receives condition information concerning the operation time, which is the first indicator. Specifically, a restriction value is input to the input window D74 and the button B51 is pressed on the user interface screen I207e, whereby the CPU 610 receives, as the condition information, the restriction value input to the input window D74.

In step S210 in FIG. 7, the CPU 610 determines, based on the condition information 630b received in step S209, a search range of the optimization processing and a parameter set used for a search. Specifically, the CPU 610 determines a search range of the optimization processing using an upper limit value of the operation time received via the input window D74 in step S209. Irrespective of an input on the user interface screen I207e, the CPU 610 determines, as a parameter set serving as an initial solution used for the search, a parameter set decided at random.

In this embodiment as well, the search range of the optimization processing is determined based on the received condition information (see FIG. 17). Accordingly, compared with a form in which the search range of the optimization processing does not reflect an intention of the user, a parameter set meeting the intention of the user can be obtained in a shorter time.

F. Sixth Embodiment

A sixth embodiment is different from the first embodiment in specific processing in steps S207 and S209 in FIG. 7. Otherwise, the sixth embodiment is the same as the first embodiment.

Figure 18:
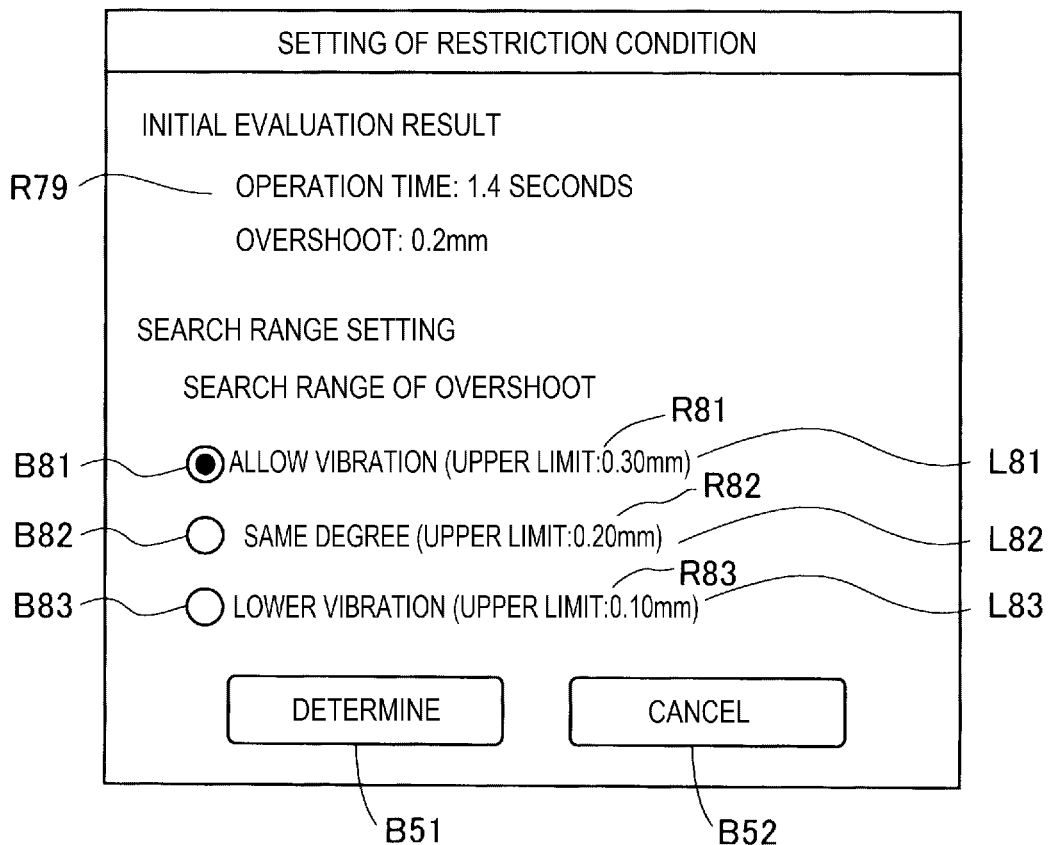
FIG. 18 is a diagram showing a user interface screen displayed on the display of the setting device in step S207 in a sixth embodiment.

FIG. 18 is a diagram showing a user interface screen I207f displayed on the display 602 of the setting device 600 in step S207 in the sixth embodiment. The user interface screen I207f includes the reference display R79, displays L81 to L83 of operation modes, and buttons B81 to B83.

The reference display R79 is the same as the reference display R79 in the fourth embodiment shown in FIG. 16.

The buttons B81 to B83 are buttons for selecting the operation modes represented by the displays L81 to L83. The buttons B81 to B83 are configured such that only one of the buttons B81 to B83 can be selected.

The displays L81 to L83 of the operation modes represent three operation modes. The operation modes represented by the displays L81 to L83 are operation modes corresponding to candidates of three kinds of condition information, degrees of which are different about the overshoot amount, which is the second indicator. The three operation modes represented by the displays L71 to L73 are specifically a first mode for allowing vibration, a third mode for further reducing vibration, and a second mode having the same degree of the overshoot amount compared with the standard parameters 630f among the initial parameters 630d.

The displays L81 to L83 of the operation modes include reference displays R81 to R83. The reference displays R81 to R83 are displays based on values of the overshoot amount acquired about the standard parameters 630f among the initial parameters 630d in step S203.

The reference displays R81 to R83 indicate candidates of condition information. The reference display R82 indicates, as a candidate of a restriction value, a value of 0.20 mm of the overshoot amount acquired in step S203. The reference display R81 indicates, as a candidate of the restriction value, a value 1.5 times as large as the value of 0.20 mm of the overshoot amount acquired in step S203. The reference display R83 indicates, as a candidate of the restriction value, a value 0.5 times as large as the value of 0.20 mm of the overshoot amount acquired in step S203.

By performing such processing, candidates of a realistic plurality of kinds of condition information based on the values of the overshoot amount acquired using the standard parameters 630f can be presented to the user as the reference displays R79 and R81 to R83. Accordingly, the user can input realistic condition information after viewing the reference displays R79 and R81 to R83 based on the values of the overshoot amount OS obtained when the standard parameters 630f are used. Accordingly, even a user not having sufficient experience in setting of a parameter set can adjust the parameter sets of the robots 1 to 3.

The first mode represented by the display L81 of the operation mode is associated with the high-speed parameters 630e among the initial parameters 630d (see the middle left part of FIG. 6). The third mode represented by the display L83 of the operation mode is associated with the high-accuracy parameters 630g among the initial parameters 630d. The second mode represented by the display L82 of the operation mode is associated with the standard parameters 630f among the initial parameters 630d.

In step S209 in FIG. 7, the CPU 610 receives condition information concerning the overshoot amount OS, which is the second indicator. Specifically, the CPU 610 receives condition information by receiving selection out of the displays L81 to L83 of the three operation modes by the buttons B81 to B83 of the user interface screen I207f.

When the button B81 is selected, the first mode represented by the display L81 of the operation mode is input as the condition information. When the button B82 is selected, the second mode represented by the display L82 of the operation mode is input as the condition information. When the button B83 is selected, the third mode represented by the display L83 of the operation mode is input as the condition information. The received condition information is stored in the RAM 630.

By performing such processing, the user can input condition information by selecting one candidate out of candidates of a plurality of kinds of condition information based on the values of the overshoot amount acquired in step S203. Accordingly, even a user not having sufficient experience in setting of a parameter set can input condition information about the overshoot amount.

G. Other Embodiments

G1. Another Embodiment 1

(1) In the embodiments explained above, the operation parameters 44c to be optimized include the limited maximum acceleration a0, the upper limit maximum acceleration a1, the gradient b of the reference target acceleration Ast, the gradient d of the load correction coefficient CL, and the parameters representing the servo gains (see FIGS. 4 and 5). However, the operation parameters 44c to be optimized can include the operation parameters 44c other than these operation parameters 44c, for example, parameters representing relay points of an operation.

(2) In the embodiments explained above, the optimization of the operation parameters 44c is explained using, as an example, the processing for picking up the target object W with the gripper 23 of the robot 3 (see FIGS. 1 and 3). However, the processing for optimizing parameters is not limited to the optimization of the operation parameters 44c in the pickup processing and is applicable to other various kinds of processing.

For example, the processing for optimizing parameters can be processing for disposing the imaging section 21 and processing for disposing the illuminating section 22. That is, the optical parameters 44d can be set as a target of the optimization processing (see the upper part of FIG. 3). When the robots 1 to 3 include force sensors, the processing for optimizing parameters can be processing including force control. That is, the force control parameters 44e can be set as a target of the optimization processing (see the upper part of FIG. 3). The processing for optimizing parameters is also applicable to, for example, screwing, insertion, boring by a drill, deburring, polishing, assembly, and product check.

(3) In the embodiments explained above, the three sets of initial parameter sets are prepared (44p1 to 44p3 in FIG. 2). However, the number of parameter sets prepared in advance may be other numbers such as one set, two sets, and four or more sets.

(4) In the embodiments explained above, the initial parameters 44p are decided by the optimization processing by the computer (see the lower left part of FIG. 2). However, the initial parameters may be decided by a human having sufficient experience about setting of parameters of robots. The initial parameters set by the human may be adjusted by the optimization processing by the computer later. Further, the initial parameters set by the optimization processing by the computer may be adjusted by the human later.

(5) In the embodiments explained above, in step S203 in FIG. 7, the CPU 610 acquires the values of the various indicators obtained when the CPU 610 causes the robot 3 to execute the target operation using the initial parameters 630d. The number of times of execution in that case may be one or may be plural. When the number of times of execution is plural, an indicator acquired in step S203 can be an average, a best value, a worst value, and the like of values of an actually obtained indicator.

(6) In the embodiments explained above, in steps S203 and S225 in FIG. 7, the CPU 610 causes the robot 3 to actually operate using the parameter set and measures the values of the first indicator and the second indicator. However, the CPU 610 may perform a simulation using a simulator that can reproduce residual vibration of a robot and may perform evaluation of control by the parameter set.

(7) In the first embodiment explained above, the reference display shows, as the candidate of the restriction value, the value obtained by multiplying the value of the acquired indicator by the predetermined coefficient (see R71 to R73 in FIG. 11). However, the candidate of the restriction value may be a value decided by another method such as a value obtained by adding a predetermined amount to the value of the acquired indicator or subtracting the predetermined amount from the value of the acquired indicator.

(8) In the first embodiment explained above, the reference displays R71 to R73 are the displays based on the values of the overshoot amount, which is the second indicator, acquired about the standard parameters 630f among the initial parameters 630d in step S203. However, the reference displays can also be displays based on the values of the first indicator acquired about the initial parameters. As explained in the second embodiment, the reference displays can be displays based on both of the value of the first indicator and the value of the second indicator acquired about the initial parameters (see R74a to R76a and R74b to R76b in FIGS. 14, R77 and R78 in FIG. 15, and R79 in FIGS. 16 to 18).

(9) In the first embodiment explained above, the operation modes represented by the displays L71 to L73 are the operation modes corresponding to the candidates of the three kinds of condition information having different degrees about the overshoot amount, which is the second indicator (see R71 to R73 in FIG. 11). However, the operation modes corresponding to the displays may be operation modes corresponding to candidates of a plurality of kinds of condition information having different degrees about the operation time, which is the first indicator. The operation modes corresponding to the displays may be operation modes corresponding to candidates of a plurality of kinds of condition information having different degrees about both of the first indicator and the second indicator (see R74a to R76a and R74b to R76b in FIG. 14). Further, the operation modes corresponding to the displays may include operation modes corresponding to candidates of a plurality of kinds of condition information having different degrees about one of the first indicator and the second indicator but are equal about the other.

(10) In the embodiments explained above, the three operation modes are shown by the displays L71 to L73 in step S207 in the first embodiment (see FIG. 11). However, the number of operation modes shown in step S207 in FIG. 7 may be other numbers such as one, two, and four or more.

(11) In the first, second, and sixth embodiments explained above, the condition information is the information representing one operation mode selected out of the three operation modes (see S209 in FIG. 7 and B73 in FIG. 11, B74 in FIG. 14, and B81 in FIG. 18). In the third to fifth embodiments explained above, the condition information is the restriction values, which are the upper limits of the indicators, input to the input windows D73 to D74 (see S209 in FIG. 7 and D71 and D72 in FIG. 15, D73 in FIG. 16, and D74 in FIG. 17). However, the condition information only has to be information for deciding conditions for the optimization processing for the parameter set for controlling the target operation such as ideal values considered by the user about the first indicator and/or the second indicator, the information being information concerning at least one of the first indicator and the second indicator. However, the condition information is desirably condition information concerning indicators other than indicators set as targets of the optimization processing.

(12) In the embodiments explained above, in the expression (Eq4) is the constant. However, X may be set to be gradually larger in the repetition in the optimization processing. With such a form, a solution can be more stably obtained.

(13) In step S220 in the embodiments explained above, the optimization processing is performed by the CMA-ES (see FIG. 7). However, the optimization processing can also be performed by other methods.

For example, the optimization processing can also be performed using a Bayesian optimization algorithm. The Bayesian optimization is a method of, assuming that a black box function for giving an output y according to an m-dimensional input x conforms to a Gaussian Process (GP), searching for the input x for maximizing the output y. By performing processing assuming that the black box function conforms to the Gaussian Process, compared with a form of assuming that an observation value of an objective function conforms to another distribution, optimization matching various objective functions to a high degree can be performed by simple processing.

For example, when the optimization processing is performed by a Nelder-Mead method, processing explained below can be performed. When there are N parameters of a parameter set to be optimized, the Nelder-Mead method is applied to the optimization processing for the parameter set as explained below. First, in an N-dimensional space, a polyhedron specified by N+1 points, each of which corresponds to the parameter set, is selected. In that case, a point corresponding to the parameter set determined in step S210 in FIG. 7, for example, the high-accuracy parameters $630g$ is set as the center of gravity of the polyhedron. In other words, N+1 parameter sets are determined based on the high-accuracy parameters $630g$ such that the high-accuracy parameters $630g$ are in the center of gravity. A point where a value of the objective function f(x) is the best among the N+1 points is moved to the opposite side of a hyper plane decided by the other N points while keeping the volume of the polyhedron. N+1 points are determined anew based on a value of an objective function of each of N+2 points including a new point. A position of the point added anew is decided based on a value of an objective function of each of immediately preceding N+2 points. By repeating such processing, finally, the polyhedron moves toward an optimum solution and decreases in size.

In such a form as well, even a user not having sufficient experience in setting of a parameter set can adjust a parameter set of a robot based on the reference displays R71 to R73 based on the values of the indicators obtained when the initial parameter sets $44p1$ to $44p3$ are used (see FIG. 11).

(14) In the embodiments explained above, single-objective optimization for calculating a parameter set for minimizing T(x) is performed under restriction about the overshoot amount O(x) (see (Eq4) and S220 in FIG. 7). However, for example, multi-objective optimization for the purpose of optimization of two or more of the operation time, the overshoot amount, the vibration amount, the noise level, the estimated life, and the torque ratio may be performed to determine a parameter set.

In such a case, it is preferable that a search range is decided based on input condition information. For example, at least one of an upper limit and a lower limit of an indicator for deciding the search range can be a value obtained by multiplying a value of an acquired indicator by a predetermined coefficient. At least one of the upper limit and the lower limit of the indicator for deciding the search range can be a value obtained by adding a predetermined amount to the value of the acquired indicator or subtracting the predetermined amount from the value of the acquired indicator.

(15) In the embodiments explained above, the end condition for the repeated processing in step S220 in FIG. 7 is that the processing in steps S223 to S225 is executed the predetermined number of times. However, the end condition for the repeated processing of optimization may be another condition, for example, a condition that one or more solutions having values of an objective function more excellent than a predetermined threshold are obtained.

(16) In the first embodiment explained above, in step S250 in FIG. 7, the operation time OT and the overshoot amount OS of a single parameter set obtained by the optimization processing are shown (see FIG. 13). However, about a plurality of parameter sets obtained in the process of the optimization processing, one or both of the first indicator and the second indicator may be presented to cause the user to select one parameter set out of the plurality of parameter sets (see the black circles and the white circle in FIG. 12).

(17) In the embodiments explained above, the parameters to be optimized are parameters for controlling the operation of a vertical articulated robot (see FIGS. 1 and 3). However, the parameters to be optimized can also be parameters for controlling the operations of other robots such as a horizontal articulated robot and a Cartesian coordinate robot. For example, the parameters to be optimized can also be parameters for controlling the operation of a robot including seven or more working axes and the operation of a plural-arm robot such as a double-arm robot. In general, the robot including the seven or more working axes and the plural-arm robot have larger loads compared with the other robots. Accordingly, when the parameters for controlling the operations of such robots are optimized, the objective function desirably includes "a driving force required when the robot performs the operation".

G2. Another Embodiment 2

In step S203 in FIG. 7 in the second embodiment explained above, the CPU 610 acquires the values of the various indicators obtained when the CPU 610 causes the robot 3 to execute the operation using the initial parameter sets $44p1$ to $44p3$. In step S207 in FIG. 7, the CPU 610 displays, on the display 602, the reference displays R74a to R76a and R74b to R76b based on the values of the operation time OT and the values of the overshoot amount OS acquired about the three sets of the initial parameter sets 44p1 to 44p3 (see FIG. 14).

However, the CPU 610 may cause the robot 3 to execute the operation using only a part of a plurality of initial parameter sets prepared in advance and acquire values of various indicators. Further, as in the first embodiment, the CPU 610 may cause the robot 3 to execute the operation using only one set of the plurality of initial parameter sets prepared in advance and acquire values of various indicators.

G3. Another Embodiment 3

In step S207 in FIG. 7 in the second embodiment explained above, the CPU 610 displays, on the display 602, the reference displays R74a to R76a and R74b to R76b based on the values of the operation time OT and the values of the overshoot amount OS acquired about the three sets of the initial parameter sets 44p1 to 44p3. However, reference display may be prepared in advance and displayed only about a part of the plurality of initial parameter sets used for the execution of the operation in step S203.

G4. Another Embodiment 4

In the third embodiment, the reference displays R77 and R78 in step S207 are displays based on only the best value of the operation time and the best value of the overshoot amount among the values of the operation time and the values of the overshoot amount acquired about the operations by the three sets of initial parameter sets in step S203 (see FIG. 15). However, the reference displays may include displays of values other than the best values about the indicators. For example, the reference displays may include display of best values and display of worst values about the indicators out of plural values of the indicators acquired by the execution or simulation of the operation.

G5. Another Embodiment 5

In the first embodiment, the displays L71 to L73 of the operation modes represent the three operation modes. The operation modes represented by the displays L71 to L73 are the operation modes corresponding to the candidates of the three kinds of condition information having different degrees about the overshoot amount, which is the second indicator (FIG. 11). However, a process for displaying, on the display section, the reference displays based on the values of the indicators acquired about the initial parameter set may be display of information, which is not candidates of the condition information, like the reference displays R77 to R79 in the third to fifth embodiments (see FIGS. 15 to 17).

G6. Another Embodiment 6

In step S209 in FIG. 7 in the first embodiment explained above, the CPU 610 receives the condition information by receiving selection out of the displays L71 to L73 of the three operation modes by the buttons B71 to B73 of the user interface screen I207. However, the reception of the condition information may not be the selection of the operation mode and may be an input of a numerical value like an input via the input windows D71 to D74 in the third to fifth embodiments.

G7. Another Embodiment 7

In step S210 in the first embodiment explained above, the CPU 610 determines, based on the condition information 630b received in step S209, a search range of the optimization processing and a parameter set used for a search. However, a parameter set serving as an initial solution used for the search may be decided not based on the input condition information. For example, the parameter set serving as the initial solution used for the search may be decided in advance as in the third embodiment. The parameter set serving as the initial solution used for the search may be decided at random as in the fourth embodiment.

For example, when the Bayesian optimization algorithm is used as an optimization method, the quality of a solution does not depend on the initial solution. Accordingly, the parameter set serving as the initial solution used for the search may be decided at random. On the other hand, when the optimization processing is performed using a method in which the quality of a solution depends on the initial solution like the CMA-ES or the Nelder-Mead method, it is preferable to use, as the initial solution, an initial parameter set subjected to optimization processing about a plurality of operations in advance or an initial parameter set decided by a human having experience in setting of a parameter set.

H. Still Other Embodiments

The present disclosure is not limited to the embodiments explained above and can be realized in various aspects in a range not departing from the gist of the present disclosure. For example, the present disclosure can be realized by aspects explained below. Technical features in the embodiments corresponding to technical features in the aspects described below can be substituted and combined as appropriate in order to solve a part or all of the problems of the present disclosure or in order to attain a part or all of the effects of the present disclosure. Unless the technical features are explained as essential technical features in this specification, the technical features can be deleted as appropriate.

(1) According to an aspect of the present disclosure, there is provided a method of supporting adjustment of a parameter set of a robot. The method includes: (a) a step of receiving track information for specifying a track of a target operation of the robot; (b) a step of acquiring, according to an instruction to adjust a parameter set for controlling the target operation, about one or more initial parameter sets prepared in advance, values of evaluation indicators of control results obtained when causing the robot to execute the target operation using the respective initial parameter sets; (c) a step of displaying, on a display section, one or more reference displays based on the values of the evaluation indicators acquired about the one or more initial parameter sets; and (d) a step of receiving an input of condition information for deciding a condition of optimization processing for the parameter set, the condition information being condition information about the evaluation indicators, performing the optimization processing for the parameter set according to the condition information, and determining a value of a new parameter set.

In such an aspect, after viewing the reference displays based on the values of the evaluation indicators obtained when the initial parameter set is used, a user can input condition information enough for obtaining a solution in the optimization processing. Accordingly, even a user not having sufficient experience in setting of a parameter set can adjust the parameter set of the robot.

(2) In the method according to the aspect, the step (b) may be a step of acquiring, about two or more initial parameter sets prepared in advance, values of the evaluation indicators obtained when causing the robot to execute the target operation using the respective initial parameter sets, and the step (c) may be a step of displaying, on the display section, two or more of the reference displays based on the values of the evaluation indicators acquired about the two or more initial parameter sets.

In such an aspect, the user can input condition information about the evaluation indicators after viewing reference displays based on values of evaluation indicators of a plurality of initial parameter sets. Accordingly, even a user not having sufficient experience in setting of a parameter set can adjust the parameter set of the robot reflecting a desire about the evaluation indicators.

(3) In the method according to the aspect, the two or more reference displays may be reference displays about all the initial parameter sets used for the execution of the target operation in the step (b).

In such an aspect, the user can input the condition information about the evaluation indicators after viewing the reference displays based on the values of the evaluation indicators of all the initial parameter sets. Accordingly, flexibility in reflecting a desire about the evaluation indicators is high.

(4) In the method according to the aspect, the reference displays in the step (c) may be displays based on only best values among the values of the evaluation indicators acquired in the step (b).

In such an aspect, after viewing reference displays based on best values of the evaluation indicators obtained when the initial parameter set is used, the user can input condition information about the evaluation indicators. Accordingly, even a user not having sufficient experience in setting of a parameter set can input, as the condition information about the evaluation indicators, realistic and good values of the evaluation indicators. Since reference display based on values other than the best values among the values of the evaluation indicators is not performed, the user can easily grasp the reference displays on the display section.

(5) In the method according to the aspect, the step (c) may include displaying, on the display section, displays of two or more operation modes concerning two or more candidates of the condition information, the two or more candidates having different degrees of the evaluation indicators.

In such an aspect, candidates of a realistic plurality of kinds of condition information based on the acquired values of the evaluation indicators can be presented to the user.

(6) In the method according to the aspect, the step (d) may include receiving the condition information by receiving selection out of the displays of the two or more operation modes.

In such an aspect, the user can input the condition information by selecting one out of a plurality of kinds of condition information based on the acquired values of the evaluation indicators. Accordingly, even a user not having sufficient experience in setting of a parameter set can input the condition information about the evaluation indicators.

(7) In the method according to the aspect, the step (d) may include: determining, based on the condition information, a search range of the optimization processing and the parameter set used for the optimization processing; and performing the optimization processing for the parameter set using the search range and the parameter set used for the optimization processing and determining values of a new parameter set.

In such an aspect, the search range of the optimization processing and an initial solution of the parameter set are determined based on the received condition information. Accordingly, compared with an aspect in which the initial solution of the parameter set is determined at random, a parameter set meeting an intention of the user can be obtained in a shorter time.

(8) According to another aspect of the present disclosure, there is provided a non-transitory computer-readable storage medium storing a program for causing a computer to support adjustment of a parameter set of a robot. The program causes the computer to realize: (a) a function of receiving track information for specifying a track of a target operation of the robot; (b) a function of acquiring, according to an instruction to adjust a parameter set for controlling the target operation, about one or more initial parameter sets prepared in advance, values of evaluation indicators of control results obtained when causing the robot to execute the target operation using the respective initial parameter sets; (c) a function of displaying, on a display section, one or more reference displays based on the values of the evaluation indicators acquired about the one or more initial parameter sets; and (d) a function of receiving an input of condition information for deciding a condition of optimization processing for the parameter set, the condition information being condition information about the evaluation indicators, performing the optimization processing for the parameter set according to the condition information, and determining a value of a new parameter set.

(9) According to another aspect of the present disclosure, there is provided an information processing device that supports adjustment of a parameter set of a robot. The information processing device includes: (a) a track receiving section configured to receive track information for specifying a track of a target operation of the robot; (b) an initial evaluation section configured to acquire, according to an instruction to adjust a parameter set for controlling the target operation, about one or more initial parameter sets prepared in advance, values of evaluation indicators of control results obtained when causing the robot to execute the target operation using the respective initial parameter sets; (c) a display control section configured to display, on a display section, one or more reference displays based on the values of the evaluation indicators acquired about the one or more initial parameter sets; and (d) a parameter searching section configured to receive an input of condition information for deciding a condition of optimization processing for the parameter set, the condition information being condition information about the evaluation indicators, perform the optimization processing for the parameter set according to the condition information, and determine a value of a new parameter set.

The present disclosure can also be realized in various aspects other than the above. For example, the present disclosure can be realized in aspects such as a control device of a robot system, a computer program for realizing a function of the control device, and a non-transitory recording medium recording the computer program.

What is claimed is:

1. A method of supporting adjustment of a parameter set of a robot, the method comprising:
   (a) a step of receiving track information for specifying a track of a target operation of the robot;
   (b) a step of acquiring, according to an instruction to adjust a parameter set for controlling the target operation, values of evaluation indicators of control results obtained when causing the robot to execute the target operation using at least one initial parameter sets out of a plural initial parameter sets prepared in advance;
   (c) a step of displaying, on a display section, one or more reference values of the evaluation indicators based on the acquired values of the evaluation indicators, the evaluation indicators being at least one of the operation time, the overshoot amount, the vibration amount, the noise level, the estimated life, and the torque ratio; and
   (d) a step of receiving condition information for deciding a condition of optimization processing for the parameter set, the condition information being condition information about the evaluation indicators, performing the optimization processing for the parameter set according to the condition information, and determining a value of a new parameter set,
   wherein the step (c) includes displaying, on the display section, two or more operation modes corresponding to two or more candidates of the condition information, and
   wherein the step (d) includes:
   receiving the condition information by receiving selection out of the two or more operation modes,
   determining, based on the condition information, a search range of the optimization processing, wherein the condition information is a restriction value for the optimization processing;
   determining, as the parameter set used for the optimization processing, the initial parameter sets associated with the condition information; and
   performing the optimization processing for the parameter set using the search range and the parameter set used for the optimization processing and determining values of a new parameter set.

2. The method according to claim 1, wherein
   the step (b) is a step of acquiring values of the evaluation indicators obtained when causing the robot to execute the target operation using two or more initial parameter sets prepared in advance, and
   the step (c) is a step of displaying, on the display section, two or more of the reference values based on the acquired values of the evaluation indicators.

3. The method according to claim 2, wherein the two or more reference values are reference values about all the initial parameter sets used in the step (b).

4. The method according to claim 2, wherein the reference values in the step (c) are reference values based on only best values among the values of the evaluation indicators acquired in the step (b).

5. A non-transitory computer-readable storage medium storing a program for causing a computer to support adjustment of a parameter set of a robot,
   the program causing the computer to realize:
   (a) a function of receiving track information for specifying a track of a target operation of the robot;
   (b) a function of acquiring, according to an instruction to adjust a parameter set for controlling the target operation, values of evaluation indicators of control results obtained when causing the robot to execute the target operation using at least one initial parameter sets out of a plural initial parameter sets prepared in advance;
   (c) a function of displaying, on a display section, one or more reference values of the evaluation indicators based on the acquired values of the evaluation indicators, the evaluation indicators being at least one of the operation time, the overshoot amount, the vibration amount, the noise level, the estimated life, and the torque ratio; and
   (d) a function of receiving condition information for deciding a condition of optimization processing for the parameter set, the condition information being condition information about the evaluation indicators, performing the optimization processing for the parameter set according to the condition information, and determining a value of a new parameter set,
   wherein the function (c) includes displaying, on the display section, two or more operation modes corresponding to two or more candidates of the condition information, and
   wherein the function (d) includes:
   receiving the condition information by receiving selection out of the two or more operation modes,
   determining, based on the condition information, a search range of the optimization processing, wherein the condition information is a restriction value for the optimization processing;
   determining, as the parameter set used for the optimization processing, the initial parameter sets associated with the condition information; and
   performing the optimization processing for the parameter set using the search range and the parameter set used for the optimization processing and determining values of a new parameter set.

6. An information processing device that supports adjustment of a parameter set of a robot, the information processing device comprising:
   (a) a track receiving section configured to receive track information for specifying a track of a target operation of the robot;
   (b) an initial evaluation section configured to acquire, according to an instruction to adjust a parameter set for controlling the target operation, values of evaluation indicators of control results obtained when causing the robot to execute the target operation using at least one initial parameter sets out of a plural initial parameter sets prepared in advance;
   (c) a display control section configured to display, on a display section, one or more reference values of the evaluation indicators based on the acquired values of the evaluation indicators, the evaluation indicators being at least one of the operation time, the overshoot amount, the vibration amount, the noise level, the estimated life, and the torque ratio; and
   (d) a parameter searching section configured to receive an input of condition information for deciding a condition of optimization processing for the parameter set, the condition information being condition information about the evaluation indicators, perform the optimization processing for the parameter set according to the condition information, and determine a value of a new parameter set,
   wherein the display control section is further configured to display, on the display section, two or more operation modes corresponding to two or more candidates of the condition information, wherein the parameter searching section is further configured to:
receive the condition information by receiving selection out of the two or more operation modes,
determine, based on the condition information, a search range of the optimization processing, wherein the condition information is a restriction value for the optimization processing;
determine, as the parameter set used for the optimization processing, the initial parameter sets associated with the condition information; and
perform the optimization processing for the parameter set using the search range and the parameter set used for the optimization processing and determining values of a new parameter set.

* * * * *